United States Patent
Xia et al.

(10) Patent No.: US 12,530,902 B2
(45) Date of Patent: Jan. 20, 2026

(54) VEHICLE LIGHT CLASSIFICATION SYSTEM

(71) Applicant: Waymo LLC, Mountain View, CA (US)

(72) Inventors: Fei Xia, Sunnyvale, CA (US); Bing Wu, San Jose, CA (US); David Lee, San Carlos, CA (US); Zijian Guo, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 579 days.

(21) Appl. No.: 17/531,230

(22) Filed: Nov. 19, 2021

(65) Prior Publication Data

US 2023/0162508 A1 May 25, 2023

(51) Int. Cl.
*G06V 20/58* (2022.01)
*G06F 18/214* (2023.01)
*G06F 18/2431* (2023.01)
*G06V 10/22* (2022.01)
*G06V 10/40* (2022.01)
*G06V 20/56* (2022.01)
*G06N 20/00* (2019.01)

(52) U.S. Cl.
CPC ............ *G06V 20/56* (2022.01); *G06F 18/214* (2023.01); *G06F 18/2431* (2023.01); *G06V 10/22* (2022.01); *G06V 10/40* (2022.01); *G06N 20/00* (2019.01)

(58) Field of Classification Search
None
See application file for complete search history.

(56) References Cited

U.S. PATENT DOCUMENTS

| | | |
|---|---|---|
| 2017/0364758 A1 | 12/2017 | Minster |
| 2018/0137647 A1* | 5/2018 | Li .............................. G06T 7/73 |
| 2019/0092318 A1* | 3/2019 | Mei .......................... G06N 3/04 |
| 2019/0370574 A1* | 12/2019 | Wang ..................... G06N 3/045 |
| 2019/0384994 A1* | 12/2019 | Frossard ................ G06V 10/82 |
| 2020/0234066 A1 | 7/2020 | Lee et al. |
| 2021/0150410 A1* | 5/2021 | Liang ....................... G06N 5/01 |

(Continued)

OTHER PUBLICATIONS

Chen, Yiping, et al. "Lidar-video driving dataset: Learning driving policies effectively." Proceedings of the IEEE Conference on Computer Vision and Pattern Recognition. 2018. (Year: 2018).*

(Continued)

*Primary Examiner* — Sean M Conner
(74) *Attorney, Agent, or Firm* — Lowenstein Sandler LLP

(57) ABSTRACT

The described aspects and implementations enable vehicle light classification in autonomous vehicle (AV) applications. In one implementation, disclosed is a method and a system to perform the method that includes, obtaining, by a processing device, first image data characterizing a driving environment of an autonomous vehicle (AV). The processing device may identify, based on the image data, a vehicle within the driving environment. The processing device may process the image data using one or more trained machine-learning models (MLMs) to determine a state of one or more lights of the vehicle and cause an update to a driving path of the AV based on the determined state of the lights.

20 Claims, 8 Drawing Sheets

(56) References Cited

U.S. PATENT DOCUMENTS

2022/0327843 A1* 10/2022 Belman ................ G06V 20/588

OTHER PUBLICATIONS

Li, Minle, et al. "One-stage multi-sensor data fusion convolutional neural network for 3d object detection." Sensors 19.6 (2019): 1434. (Year: 2019).*

Narayanan, Athma, Avinash Siravuru, and Behzad Dariush. "Gated recurrent fusion to learn driving behavior from temporal multimodal data." IEEE Robotics and Automation Letters 5.2 (2020): 1287-1294. (Year: 2020).*

Sindagi, Vishwanath A., Yin Zhou, and Oncel Tuzel. "Mvx-net: Multimodal voxelnet for 3d object detection." 2019 International Conference on Robotics and Automation (ICRA). IEEE, 2019. (Year: 2019).*

Geng, Keke, et al. "Deep dual-modal traffic objects instance segmentation method using camera and lidar data for autonomous driving." Remote Sensing 12.20 (2020): 3274. (Year: 2020).*

Wang, Yue, et al. "DETR3D: 3D Object Detection from Multi-view Images via 3D-to-2D Queries." arXiv preprint arXiv:2110.06922 (2021). (Year: 2021).*

Zhou, Bolei, et al. "Learning deep features for discriminative localization.", Computer Science and Artificial Intelligence Laboratory, MIT, Dec. 14, 2015, 10 pages.

Extended European Search Report (EESR), for Application No. 22208447.7—Communication pursuant to Article 62 EPC (R. 63 EPC), dated Feb. 23, 2023, 6 pages.

* cited by examiner

VEHICLE LIGHT CLASSIFICATION SYSTEM

TECHNICAL FIELD

The instant specification generally relates to autonomous vehicles. More specifically, the instant specification relates to improving autonomous driving systems and components by classifying light of vehicles in a driving environment of an autonomous vehicle.

BACKGROUND

An autonomous (fully or partially self-driving) vehicle (AV) generally operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
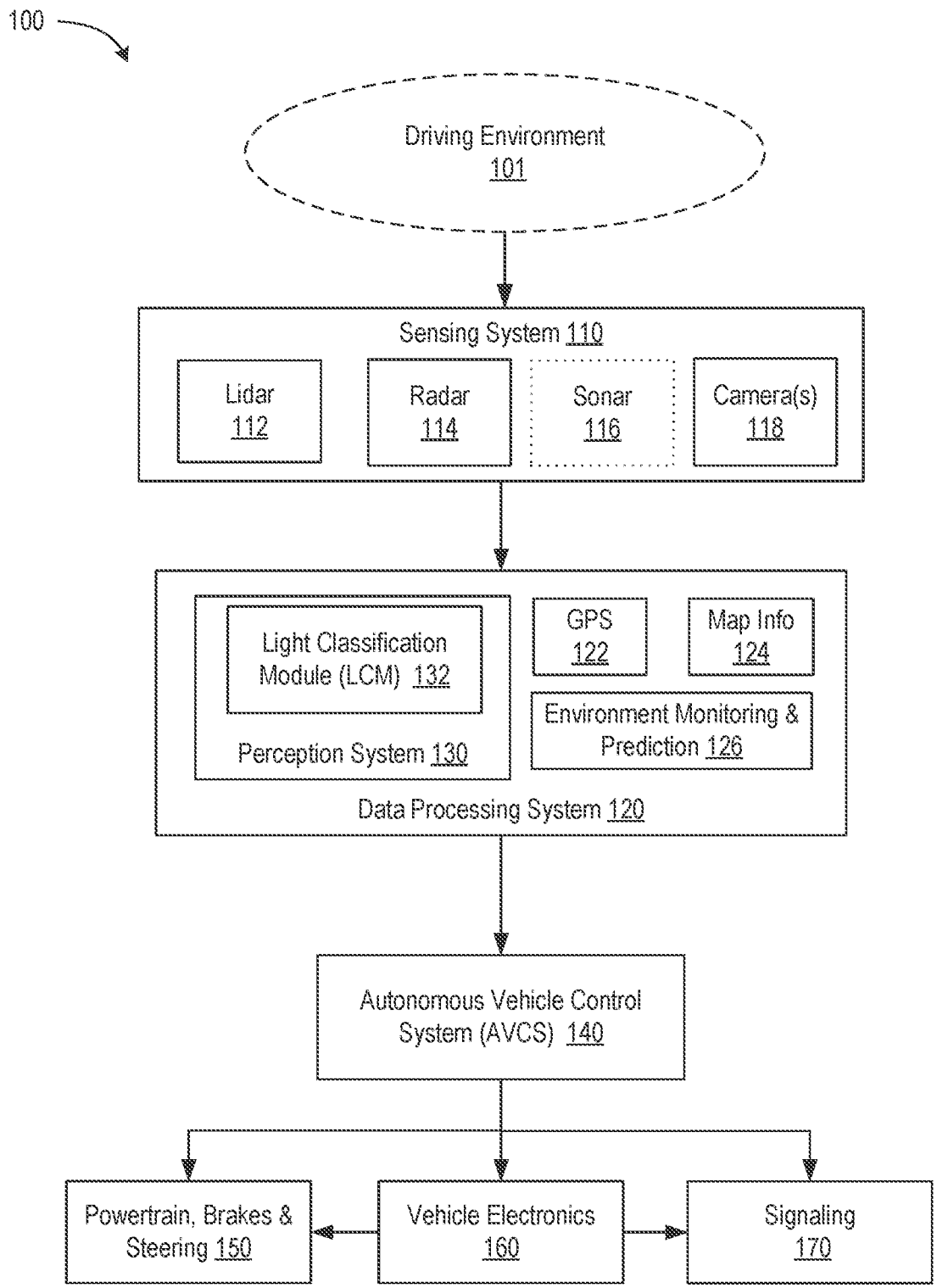
FIG. 1 is a diagram illustrating components of an example autonomous vehicle (AV) 100 capable of vehicle light classification, in accordance with some implementations of the present disclosure.

In one implementation, disclosed is a method that includes obtaining, by a processing device, image data characterizing a driving environment of an autonomous vehicle (AV); identifying, based on the image data, a vehicle disposed within the driving environment; processing the image data using a first machine-learning model (MLMs); and determining a state of one or more lights of the vehicle using the processed image data.

In another implementation, disclosed is a system that includes a sensing system of an autonomous vehicle (AV), the sensing having: a first camera to capture first image data characterizing a driving environment of an autonomous vehicle (AV); a memory; and a processing device, coupled to the memory, to obtain, from the first camera, the first image data; identify, based on the first image data, a vehicle disposed within the driving environment; process the first image data using a first machine-learning models (MLM); determine a state of one or more lights of the vehicle using the processed image data; and cause an update to a travel path of the AV based on the state of the one or more lights of the vehicle.

In another implementation, disclosed is method of generating training data for a machine learning model, wherein generating the training data includes: identifying a first training input having first image data depicting a first vehicle in a driving environment of an autonomous vehicle (AV); identifying a first target output for the first training input, wherein the first target output indicates a first vehicle light classification corresponding to a first identified state of one or more lights of the first vehicle; and providing the training data to train the machine learning model on (i) a set of training inputs comprising the first training input; and (ii) a set of target outputs comprising the first target output.

DETAILED DESCRIPTION

An autonomous vehicle (AV) makes numerous decisions and performs many actions when navigating through a driving environment. AVs often depend on accurate perceptions of the driving environment to make determinations that affect operational decision-making. For example, an AV can predict actions of other agents (e.g., neighboring vehicles, pedestrians, moving and/or stationary objects, etc.) and make decisions that alter a driving path of the AV such as to avoid collisions with the other agents. Perceiving and understanding vehicle lights (e.g., of other vehicles) helps an AV make operational decisions to safely navigate through a driving environment. For example, vehicle lights can provide a strong indication to an AV of another vehicle's behavior or intent (e.g., turn signal lights indicating a cut-in, reverse lights indicating parking behavior or intention, hazard lights indicating double parking behavior or intention, etc.), and can help the AV comply with the law (e.g., yielding to emergency response vehicles with emergency lights, stopping and yielding to school buses with active flashing lights, etc.). Classifying the vehicle lights of neighboring vehicles can assist the AV in making informed decisions regarding the surrounding driving environment. The term "driving environment" should be understood to include all environments in which a motion of self-propelled vehicles can occur. For example, "driving environment" can include any possible flying environment of an aircraft or a marine environment of a naval vessel.

Classification of vehicle lights can present many challenges. The existing methods of light detection and classification include a variety of heuristics developed for different kinds of lights (e.g., tail lights, turning lights). Different vehicle lights, however, are used in multiple scenarios (e.g., turning lights for signalling an intention to turn and for indicating a disabled vehicle) and often have different types, sizes, and appearances. Collecting a sufficient amount of data for developing exhaustive heuristics for all such different types of lights can be difficult, especially in view of the fact that some lights are encountered only occasionally during a driving session (e.g., emergency response vehicles, accidents, school bus scenarios, etc.). In a live driving environment, many lights can be difficult to detect due to environmental factors such as lighting (e.g., reflections from other objects), occlusion (e.g., by other objects), unfavorable image capture angles (e.g., field of view challenges of camera), and so forth. Additionally, camera patches or selections of image data may not well represent a real vehicle's light signal (e.g., temporal aliasing for an auto camera, spatial aliasing for downsampling, blooming/halos within the image data, etc.). Different vehicle types and models may have different light configurations that make it very inconsistent in determining exact light positions, light quality, and/or different light behavior (e.g., flashing at unique cadences, having different light color hues, etc.). Moreover, different vehicle lights may have different technical and/or legal requirements.

Aspects and implementations of the present disclosure address these and other shortcomings of a sensing system of an autonomous vehicle (AV) by enabling methods and systems that reliably and quickly determine vehicle light classification of neighboring vehicles in a driving environment of the AV. For example, the methods and systems may capture image data associated with a state of a driving environment and determine that a neighboring vehicle is located within the driving environment of the AV. The configuration and status of one or more vehicles can be captured in the image data and tracked over a series of image frames to determine a vehicle light classification. For example, one or more vehicle light classifications may include making determinations associated with a vehicle's activation and/or deactivation of a left turn signal, right turn signal, hazard light, flashing light, reverse light, headlight, taillight and/or brake light of a neighboring vehicle.

One or more vehicle classification determinations may be broken down into sub-categories. For example, in flashing lights, there can be several sub-categories e.g., school bus flashing light, construction vehicle flashing light, and/or emergency vehicle flashing light. In some embodiments, labeling of the sub-categories can be selectively utilized (e.g., to reduce labeling effort, some sub-categories may be visually similar, select a level of classification precision). In another example, tail lights may include brake light and/or running taillight.

A perception system of the AV may obtain image data indicating a state of a driving environment of the AV. The perception system may identify neighboring vehicles present in the driving environment of the AV (e.g., area within a predetermined proximity to the AV). Some of the identified neighboring vehicles may be going in the same direction as the AV while other vehicles may be going in a different (e.g., the opposite) direction. The perception system may process the image data (e.g., using a machine learning model (MLM)) to obtain one or more feature vectors representative of the state of the driving environment. The perception system may process (e.g., using a MLM) the one or more feature vectors to obtain a vehicle light classification. The vehicle light classification may correspond to an identified configuration and status of one or more lights of one of the neighboring vehicles. This process may be performed multiple times (e.g., in parallel) for each identified neighboring vehicle in the driving environment. The process may include one or more MLM models. The MLM models may include deep learning models such as one or more of convolutional neural networks (CNNs) (e.g., an arrangement of convolutional neuron layers), transformers and/or vision transformers (ViT).

In some embodiments, the perception system of the AV encodes a series of images, frame by frame, to obtain the one or more feature vectors. The feature vectors can be temporally associated with each other. The processing of the feature vectors can include fusing the one or more feature vectors into a feature vector unit or set and inputting the feature vector unit or set into a MLM.

The perception system may be capable of obtaining image data from multiple sources (e.g., different cameras with varying image capture specifications) and performing vehicle light classifications in associations with data received from the various image acquisition sources. In some embodiments, the perception system may leverage data pre-processing techniques on the image data to normalize, filter, and/or otherwise modify the data in preparation for vehicle light classification. For example, the perception system may employ a light imaging detection and ranging (lidar) sensor to capture data associated with the state of the driving environment. The lidar sensor may include a laser-based unit capable of determining distances to the objects and velocities of the objects in the driving environment. For example, the captured data may include a multi-dimensional map that is obtained using transmitted laser signals (e.g., pulses or continuous signals) that reflect off various objects (e.g., other vehicles) within the driving environment. The perception system can determine a boundary of the neighboring vehicles within the image data using the lidar data (e.g., vehicle mask) and can further filter (e.g., crop) image data to focus on the portions of the image data associated with the neighboring vehicle.

The various methodology and systems described herein may provide focused, filtered, and diverse (e.g., multiple driving environments, fields of view, camera angles, image capture specification such as resolutions and frame capture rates) training data to train the MLM. The trained MLM can be instantiated as part of the perception system of an AV. During a driving mission of the AV, the trained MLM can receive a new input that includes run-time image data indicative of a state of a neighboring vehicle in an actual driving environment of the AV. The trained MLM can produce an output that indicates a vehicle light classification corresponding to an identified configuration and status of one or more lights of the neighboring vehicle. The perception system can leverage the vehicle light classification in making decisions corresponding to the AV.

Although, for brevity and conciseness, various systems and methods are described in conjunction with autonomous vehicles, similar techniques can be used in various driver assistance systems that do not rise to the level of fully autonomous driving systems. For instance, in the United States, the Society of Automotive Engineers (SAE) have defined different levels of automated driving operations to indicate how much, or how little, a vehicle controls the driving, although different organizations, in the United States or in other countries, may categorize the levels differently. Disclosed techniques can be used, for example, in SAE Level 2 driver assistance systems that provide steering, braking, acceleration, lane centering, adaptive cruise control, etc., as well as other driver support. Likewise, the disclosed techniques can be used in SAE Level 3 driving assistance systems capable of autonomous driving under limited (e.g., highway) conditions. In such systems, fast and accurate classification of vehicle lights can be used to inform the driver of stopped vehicles or vehicles that are about to change their course of motion (e.g., in SAE Level 2 systems), with the driver making the ultimate driving decisions, or to make certain driving decisions (e.g., in SAE Level 3 systems), such as changing lanes or braking, without requesting feedback from the driver FIG. 1 is a diagram illustrating components of an example autonomous vehicle (AV) 100 capable of vehicle light classification, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can be or include any portion of the outside environment containing objects that can determine or affect how driving of the AV occurs. More specifically, a driving environment 110 can include any objects (moving or stationary) located outside the AV, such as roadways, buildings, trees, bushes, sidewalks, bridges, mountains, other vehicles, pedestrians, bicyclists, and so on. The driving environment 101 can be urban, suburban, rural, and so on. In some implementations, the driving environment 101 can be an off-road environment (e.g. farming or other agricultural land). In some implementations, the driving environment can be inside a structure, such as the environment of an industrial plant, a shipping warehouse, a hazardous area of a building, and so on. In some implementations, the driving environment 101 can consist mostly of objects moving parallel to a surface (e.g., parallel to the surface of Earth). In other implementations, the driving environment can include objects that are capable of moving partially or fully perpendicular to the surface (e.g., balloons, leaves, etc.). The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, lidar 112 and/or radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Lidar 112 and/or radar 114 can include one or more optical/radio/microwave sources producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. Some of the cameras 118 of the sensing system 110 can be high resolution cameras (HRCs) and some of the cameras 118 can be surround view cameras (SVCs). The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the driving environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate vehicle light classification, including a light classification module (LCM) 132 that can be used to process data provided by the sensing system 110, including images from camera(s) 118, lidar and radar data (e.g., both processed return points and low-level semantic data) from lidar 112 and/or radar 114. LCM 132 can include one or more trained models that are used to process some or all of the above data to classify vehicle lights of neighboring vehicles (e.g., configurations, statuses, and/or combinations of vehicles lights). In some implementations, LCM 132 can further provide confidence levels representing estimates of the reliability (e.g., scores) of the output predictions. Various models of LCM 132 can be trained using multiple annotated camera images, multiple sets of radar data and/or lidar data to classify vehicle light configuration and statuses of neighboring vehicles associated with measured driving environment(s).

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, (e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the moving objects. In some implementations, the environment monitoring and prediction component 126 can keep track of the changing appearance of the driving environment due to a motion of the AV relative to the driving environment. In some implementations, the environment monitoring and prediction component 126 can make predictions about how various moving objects of the driving environment 101 will be positioned within a prediction time horizon. The predictions can be based on the current locations and velocities of the moving objects as well as on the tracked dynamics of the moving objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion.

As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with LCM 132. Although not depicted explicitly in FIG. 1, in some implementations, LCM 132 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size, shape, and trajectories of the obstacles (if obstacles are moving) and select an optimal driving strategy (e.g., braking, steering, accelerating, etc.) for avoiding the obstacles. The LCM 132 can further output data indicative of the behavior of other objects (e.g., vehicles) on the road.

In some embodiments, the LCM 132 can make predictions of future states of vehicles based on determined vehicle light classifications. For example, the LCM 132 can classify a vehicle as operating with reverse lights and predict a future location and/or motion of the vehicle as imminently traveling in the reverse direction of the vehicle driving orientation. In another example, LCM 132 can classify a vehicle as having a left or right turn signal active and predict the vehicle may be imminently turning left or right, respectively, along a perceived roadway.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, lidar 112 and/or radar 114 can perceive that a vehicle in the path ahead (e.g., a current driving lane) is indicating a hazard signal (e.g., lights are flashing). The AVCS 140 can cause the AV 100 to alter a driving path (e.g., change lanes) based on the detected vehicle and the determined vehicle light classification (e.g., hazard light activated). The data processing system 120 can determine the status of a neighboring vehicle (e.g., hazard lights, braking lights, turn signals, etc.) based on the determination of the vehicle light classification. Using the vehicle light classification made by the data processing system 120, the AVCS 140 can output instructions to powertrain, brakes and steering 150 to route the AV through a temporary travel path (e.g., a detour) and return the AV to an original driving path after determining the status of the associated lane has returned to a previous state (e.g., a normal or active lane state). Additionally, or alternatively, in the same example, LCM 132 can determine that alteration to navigation instructions to comply with vehicular law. For example, LCM 132 can determine, based on a vehicle light classification, an emergency vehicle is approaching and the AV should navigate to the side of a driving environment to allow passage of the vehicle. In another example, the LCM 132 can determine, a vehicle is a school bus with flashing lights and that the AV should await the deactivation of the flashing lights before proceeding along a current driving path. The LCM 132 may provide data used to predict the behavior of objects (e.g., vehicles, pedestrians, etc.) in the driving environment of the AV. The AVCS 140 may alter driving behavior of the AV responsive to data indicating future states of objects within the driving environments. For example, LCM 132 may determine that a vehicle is attempting to turn into (e.g., merge into) a current lane of the AV based on a determination that vehicle has currently activated a turn signal and is currently disposed in a neighboring lane to the current lane of the AV. Using the output of LCM 132, the AVCS 140 can alter a driving path of the AV by causing the AV to slow down to allow the vehicle to merge into the current lane of the AV.

Figure 2:
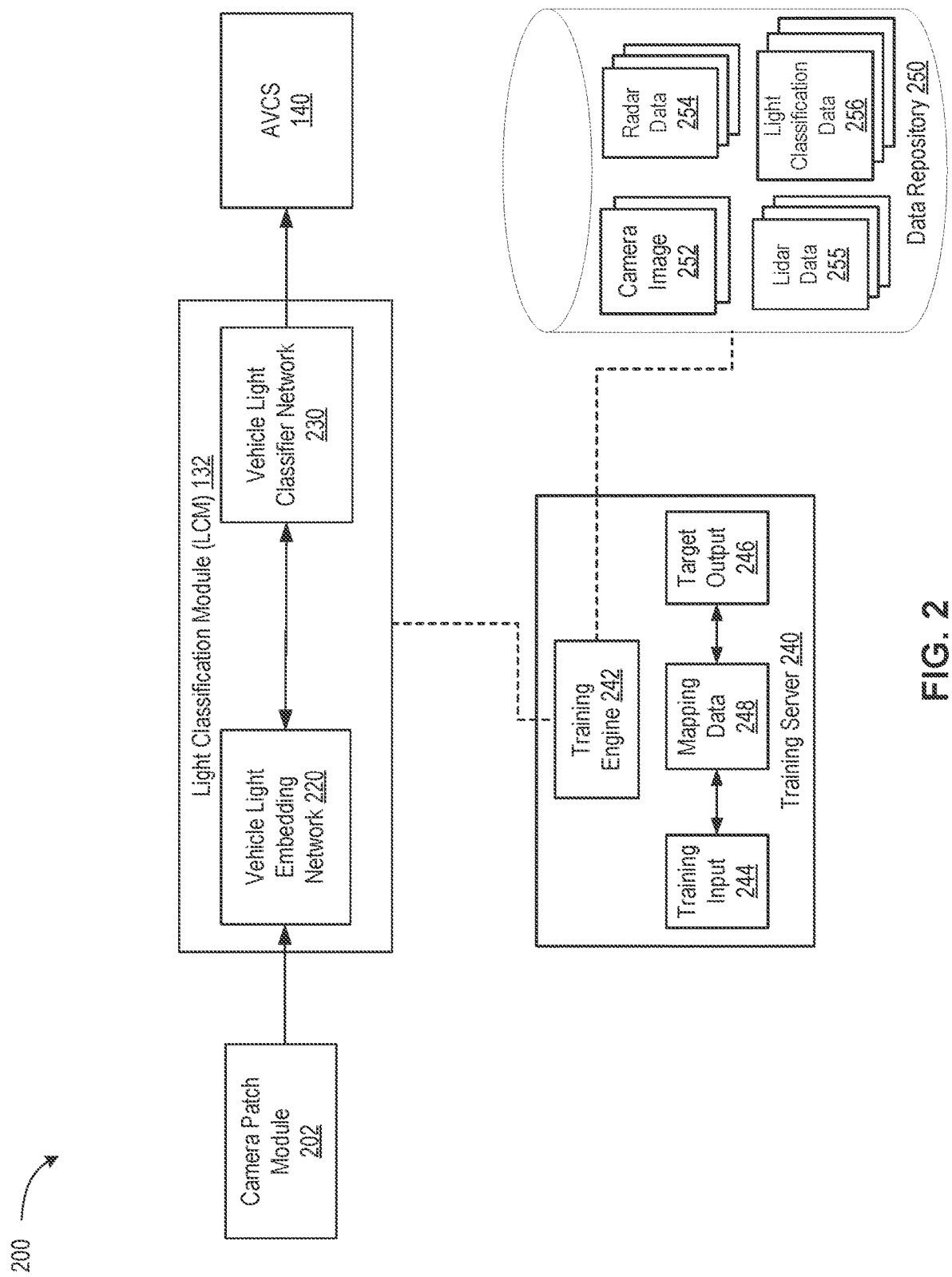
FIG. 2 is a diagram illustrating example architecture of a part of a perception system of an AV that is capable of vehicle light classification, in accordance with some implementations of the present disclosure.

FIG. 2 is a diagram illustrating example architecture of a part of a perception system 200 of an AV that is capable of vehicle light classification, in accordance with some implementations of the present disclosure. The example architecture may include aspects and features of AV 100 such as LCM 132. An input into the perception system (e.g., perception system 130 of FIG. 1) can include data obtained by sensing system 110 (e.g., lidar 112 and/or radar 114, camera 118, etc.), such as distance data, radial velocity data, camera pixel data, etc. For example, sensing system 110 may provide input to camera patch module 202.

The camera patch module 202 may receive image data from sensing system 110. As will be discussed further in later embodiments, the various subsets of the received image data may be associated with different image acquisition devices (e.g., camera-based detection, lidar-based detection), operating under different specifications (e.g. operating at 5 Hz or 10 Hz) and/or detection methods (e.g., camera-based detection or lidar-based detection). The camera patch module 202 receives associated sensor data and performs one or more pre-processing procedures to generate camera patches for the vehicle light embedding network 220. For example, camera-based detection may rely on a camera to obtain image data, while lidar-based detection may rely on depth data (e.g., lidar data or radar data) to filter (e.g., crop) or otherwise refine raw image data to generate the camera patches, as discussed herein.

A camera patch may include a sub image and/or processed image that is generated to filter out image data irrelevant to downstream processes (e.g., reduce processing load by removing parts of the image data not associated with a neighboring vehicle). For example, the camera patch module 202 may modify raw image data received from the sensing system by identifying locations of neighboring vehicles disposed within one or more image frames and removing (e.g., cropping) unneeded image data (e.g. portions of the image not associated with the vehicle). As will be discussed further in connection to other embodiments, diverse image data (e.g., image data associated with varying image acquisition specifications, image capture range, etc.) may be used in conjunction with depth data (e.g., lidar 112 and/or radar 114) to identify boundaries of vehicles (e.g., radar masking and/or lidar masking) within the image frames and filter the image data (e.g., crop) based on the identified vehicle boundaries.

As shown in FIG. 2, the perception system includes LCM 132. LCM 132 may include a vehicle light embedding network 220 and a vehicle light classifier network 230. The vehicle light embedding network 220 may receive input data (e.g., camera patches) from the camera patch module 202 and embed the image data to generate embedded image data.

In some embodiments, the vehicle light embedding network 220 may include a feature extractor to generate one or more feature vectors associated with the image data. The feature extractor can dimensionally reduce the raw sensor data (e.g., raw image data) into groups or features. For example, the feature extractor may generate features that include one or more detected vehicles, vehicle light statuses, locations of lights, etc. In some embodiments, the feature extractor performs any of partial least squares analysis, principal component analysis, multifactor dimensionality reduction, nonlinear dimensionality reduction, and/or any combination thereof. In some embodiments, the feature extractor is designed for edge detection of the sensing data. For example, the feature extractor includes methodology that aims at identifying sensor data and/or image data that changes sharply and/or that includes discontinuities (e.g., the boundaries of vehicle lights within an image frame).

In some embodiments, the feature extractor may make use of a graph neural network (GNN). The GNN may include a family of models that handle relations between sparse objects in space. Within the GNN, data from the camera patch module 202 may include objects (e.g., vehicle lights and/or vehicle light configurations) encoded into feature vectors. The GNN may employ model relations using attention-based interactions. In some embodiments, the feature extractor may make use of a convolutional neural network (CNN). A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g., determined feature vectors).

As shown in FIG. 2, the light classification module 132 includes a vehicle light classifier network 230. The vehicle light classifier network 230 receives image data (e.g., in the form of feature vectors) from the vehicle light embedding network 220. The vehicle light classifier network 230 determines vehicle light classifications based on the received image data. The vehicle light classifier network 230 may make individual vehicle light classifications for each individual vehicle within the driving environment. In some embodiments, each vehicle may be associated with multiple vehicle light classifications. The image data can be processed by the vehicle light classifier network 230 using one or more machine learning models (MLMs).

Vehicle light classifications correspond to identifiable configurations and statuses of one or more lights of an associated vehicle. Herein configurations of lights can refer to geometric relationships of the lights to the host vehicle, e.g., locations of lights at the front or rear of the vehicle, near an edge of the vehicle, near the top of the vehicle, etc.

Statuses of lights can refer to the current mode of operation of lights, e.g., steady on lights, flashing lights, etc., as well as the color of lights, e.g., red lights, orange lights, white lights, etc. The vehicle light classifications may include an indication of any number of light status and configuration combinations such as: flashing red lights, hazard lights, reverse lights, headlights, taillights, brake lights, turn signals (e.g., left or right turn signals), among other things. For example, the vehicle light classification may indicate a first vehicle is currently operating with one flashing light and a determination that the vehicle is operating with a left turn signal activated. As will be discussed in relation to FIG. 6, the various light statuses and configurations may be grouped together based on common attributes of each configuration (e.g., flashing lights and hazard lights may be labeled within the same data group).

The vehicle light classifications determined by LCM 132 (e.g., vehicle light classifier network 230) can be provided to AVCS 140. AVCS 140 evaluates the vehicle light classifications and determines whether to modify the current driving trajectory of the AV (e.g., to respond to predicted behaviors of neighboring vehicles based on the vehicle light classifications). For example, LCM 132 may determine that a vehicle is attempting to turn into (e.g., merge into) a current lane of the AV based on a determination that vehicle has currently activated a turn signal and is currently located in a neighboring lane to the current lane of the AV. Using the output of LCM 132, the AVCS 140 can alter a driving path of the AV by causing the AV to slow down to allow the vehicle to merge into the current lane of the AV.

MLMs deployed by the LCM 132 (e.g., one or both of vehicle light embedding network 220 and/or vehicle light classifier network 230) can include decision-tree algorithms, support vector machines, deep neural networks, graph neural network (GNN), and the like. Deep neural networks can include convolutional neural networks, recurrent neural networks (RNN) with one or more hidden layers, fully connected neural networks, long short-term memory neural networks, Boltzmann machines, and so on.

LCM 132 can be trained using camera images, radar data, lidar data, and vehicle light classification data that have been obtained during previous driving missions of various vehicles (e.g., autonomous and/or driver-operated) and annotated with ground truth, which can include correct identification of status and configuration of vehicle lights, e.g., based on a human input and/or lidar-based identification. Training can be performed by a training engine 242 hosted by a training server 240, which can be an outside server that deploys one or more processing devices, e.g., central processing units (CPUs), graphics processing units (GPUs), etc. In some implementations, one or more models of LCM 132 can be trained by training engine 242 and subsequently downloaded onto the perception system 130 of the AV 100. LCM 132, as illustrated in FIG. 2, can be trained using training data that includes training inputs 244 and corresponding target outputs 246 (correct matches for the respective training inputs). During training of LCM 132, training engine 242 can find one or more patterns in the training data that map each training input 244 to the target output 246.

Training engine 242 can have access to a data repository 250 storing multiple camera images 252, instances of radar data 254, instances of lidar data 255, and light classification data 256 for multiple driving situations in a variety of environments. During training, training engine 242 can select (e.g., randomly), as training data, a number of camera images 252, sets of radar data 254, sets of lidar data 255, and light classification data 256 corresponding to the selected number of camera images 252, sets of lidar data 255, and sets of radar data 254. For example, training data can include camera images 252, lidar data 255, radar data 254, etc., that depict: a vehicle with the left turn signal activated and about to begin an overtaking maneuver, a vehicle that has stalled in the middle of a driving lane and has the emergency parking lights turned on, a vehicle that is stopping at a stop sign and having the brakes lights on, a vehicle that transports an oversize load and has the hazards lights on, an ambulance (a fire truck, etc.) that has activated emergency lights, a school bus that stopped and activated red flashing lights, and so on. Numerous other depictions of data collected during driving missions can be similarly used as training data. Training data can be annotated with vehicle light classifications that identify the type of lights depicted in the data (e.g., hazard lights, reverse lights, headlights, taillights, brake lights, left turn lights, right turn lights), the status of the lights (e.g., steady, flashing, etc.), the configuration of the lights (e.g., light positioned at the front of the vehicle, at the back of the vehicle, on top of the vehicle, etc.). In some implementations, annotations can be made by a developer before the annotated data is placed into data repository 250. In some implementations, annotations may be made by a computing device, e.g., using one or more heuristics that are designed to identify specific types of lights based on the color of lights, positioning of lights relative to the vehicle/ground, behavior of the vehicle prior to (and/or after) the lights were activated, and so on. In some implementations, the annotations may be made by a device that deployed one or more pre-trained MLM of a different type, e.g., object recognition MLMs. For example, the computing device that makes annotations can first identify an object in the training data as a vehicle of a particular type (e.g., a passenger car, truck, bus, etc.), make, model, etc., and can further access a stored database of heuristics for the particular type/make/model/etc. of the identified vehicle. The heuristics can include the locations of various lights on the vehicle, the color of lights, frequency of blinking/flashing, and so on. Based on measured locations of lights and/or color of lights and frequency of lights operations, the computing device can determine what lights are being activated on the vehicle. In some implementations, the computing device can use a history of motion of the vehicle that is associated with a time interval around the time when the training data was taken. For example, the history of motion of the vehicle can include the vehicle stopping, turning, beginning motion, and so on. The correctness of determination of the type, status, and configuration of the lights made by the computing device can be checked for consistency against the history of motion. For example, if it is determined that the right turning light was flashing and the history of motion indeed includes a right turn made within a certain (e.g., 3 seconds, 5 seconds, etc.) time interval from the onset of flashing, the annotation of the right turning light can be added to the training data. In some instances, the computing device can provide developer-assisted annotations. For example, if the computing device determines that the vehicle activated emergency lights while the motion history indicates a right turn, the computing device can flag the training data, as ambiguous, to a developer, who can then make a final determination/annotation.

Annotated training data retrieved by training server 240 from data repository 250 can include one or more training inputs 244 and one or more target outputs 246 (e.g., annotations). Training data can also include mapping data 248 that maps training inputs 244 to the target outputs 246. In some implementations, mapping data 248 can identify one or more vehicle light classifications associated with camera patches (e.g., determined from a camera image, radar data, and/or lidar data). The mapping data 248 can include an identifier of the training data, location of a detected vehicle, size of the vehicle, speed and direction of motion of the vehicle, type of the vehicle (e.g., car, truck, bus, emergency vehicle, etc.), and other suitable information. In some implementations, training can be performed using mapping data that is unannotated. More specifically, training engine 242 can include object identification processing (e.g., neural network-based object identification), which can use machine-learning models trained in object identification. For example, training camera images can be input into object identification processing to determine 1) states of one or more neighboring vehicle(s) depicted in the camera image, 2) vehicle light classification(s) of the neighboring vehicle, or 3) predicted future behavior of the neighboring vehicle(s). The training camera images annotated with the outputs of the vehicle identification processing can then be used as ground truth in training of LCM 132.

During training of LCM 132, training engine 242 can change parameters (e.g., weights and biases) of various models of LCM 132 until the models successfully learn how to classify vehicle lights (target outputs 246). In some implementations, different models of LCM 132 (e.g., vehicle light embedding network 220 and vehicle light classifier network 230) can be trained separately. In some implementations, various models of LCM 132 can be trained together (e.g., concurrently). Different models can have different architectures (e.g., different numbers of neuron layers and different topologies of neural connections) and can have different settings (e.g., activation functions, classifiers, etc.).

The data repository 250 can be a persistent storage capable of storing radar data, camera images, as well as data structures configured to facilitate accurate and fast validation of radar detections, in accordance with implementations of the present disclosure. The data repository 250 can be hosted by one or more storage devices, such as main memory, magnetic or optical storage based disks, tapes or hard drives, NAS, SAN, and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3:
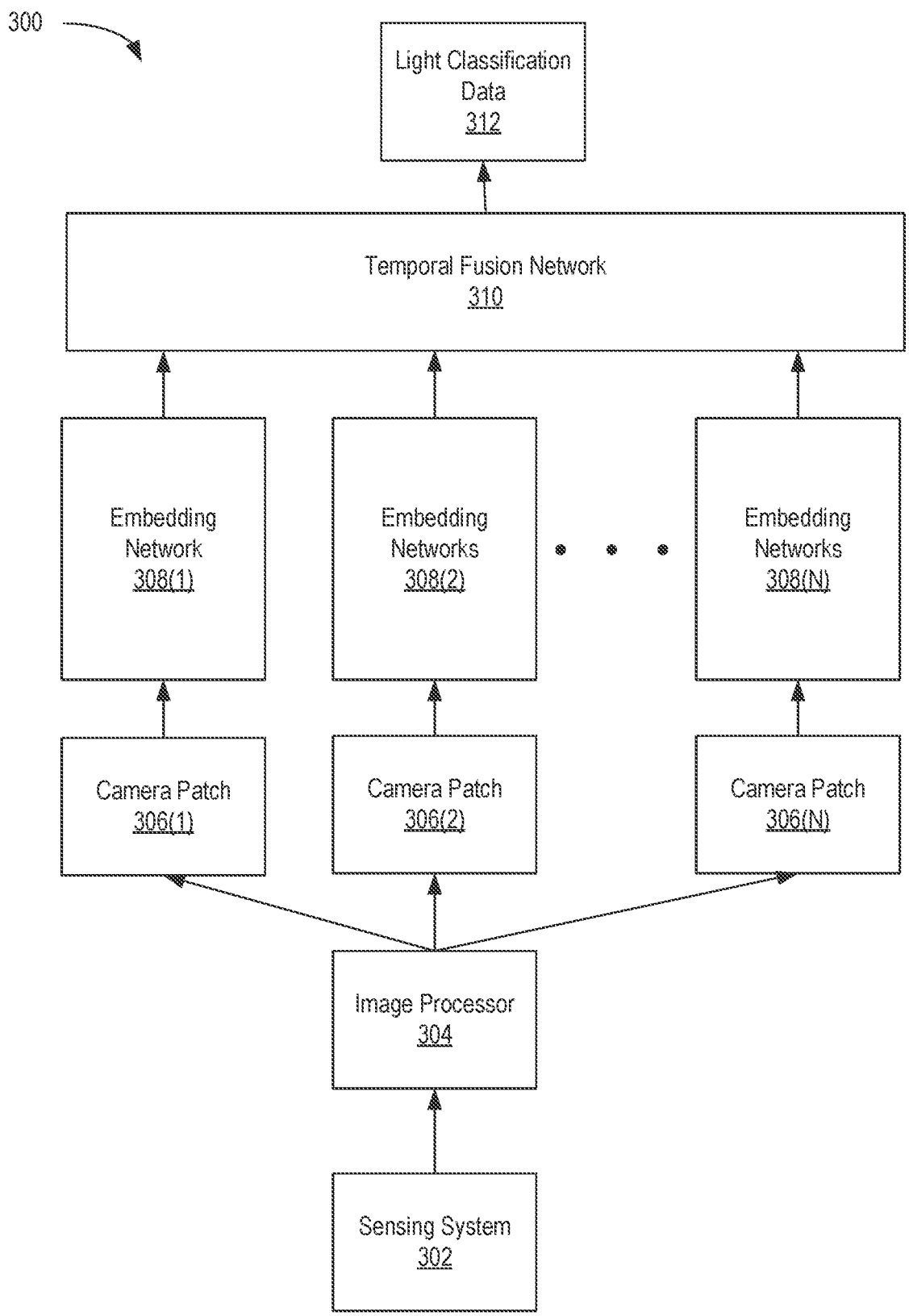
FIG. 3 is a block diagram that illustrates a vehicle light classification system in which implementations of the disclosure may operate.

FIG. 3 is a block diagram that illustrates a vehicle light classification system 300 in which implementations of the disclosure may operate. The vehicle light classification system 300 may include a sensing system 302 (e.g., sensing system 110 of FIG. 1). The sensing system 302 may include sensors such as radar sensors, lidar sensors, and/or cameras, as previously described. The sensing system 110 can provide, to image processor 304, various sensor data indicating a state of a driving environment. For example, sensor data may include images indicative of a state of the driving environment of an AV.

The image processor 304 may receive input data including sensor data and/or image data from sensing system 302. Image processor 304 may determine a neighboring vehicle in the driving environment of the AV based on the received input data. The image processor 304 processes the input data and generates camera patches 306.

Camera patches 306 may include a sub image and/or processed image that is generated to filter out image data irrelevant to downstream processes (e.g., to reduce processing load by trimming parts of data not associated with a neighboring vehicle). For example, the image processor 304 may modify raw image data received from the sensing system by identifying locations of neighboring vehicles disposed within one or more image frames and removing (e.g., cropping) unneeded image data (e.g. portions of the image not associated with the vehicle).

In some embodiments, the received sensor data includes lidar data and/or radar data. The image processor 304 determines a vehicle boundary of the neighboring vehicle within the received image data based on the lidar data. In some embodiments, image processor 304 outlines the vehicle boundary (e.g., generating a bounding box) that is included in the output camera patch 306. In some embodiments, the image processor 304 crops a portion of the image data outside the boundary of the identified vehicle.

In some embodiments, the image processor 304 may perform image downsampling of the image data to generate one or more camera patches 306. For example, the image processor 304 may leverage image patch catching and/or the use of a graphical processing unit (GPU) to perform image downsampling (e.g., to improve processing efficiency). In another example, the image processor 304 may perform bilinear downsampling (e.g., using pixel offset procedures, tensor flow alterations, and/or pixel grid realignment) to generate camera patches with greater resolution than the associated received raw image data. The image processor 304 may determine a distance from the AV to a vehicle based on an associated image frame and may selectively apply image downsampling procedure when the vehicle is located beyond a threshold distance from the AV. In some embodiments, the image processor 304 carries out image pyramid methodology. For example, the image processor 304 may generate an image pyramid by downsampling from a full image first, then in this pyramid, let each model crop the smallest image which has a larger area than the required crop. For example, the image processor 304 may leverage one or a Gaussian pyramid, a Laplacian pyramid, and/or a steerable pyramid to perform image downsampling of the image data (e.g., to generate the one or more camera patches 306).

In some embodiments, one or more vehicles may be fully or partially occluded in one or more of the image frames in the received image data. The image processor 304 may determine an occlusion of one or more vehicle lights based on the image data. In some embodiments, the image processor may leverage lidar data to determine boundaries of vehicles and determine that one or more objects detected in the image data are occluding one or more of the vehicle lights. In some embodiments, the image processor 304 may determine an occlusion and prevent camera patch generation for an associated instance of the driving environment.

Figure 4:
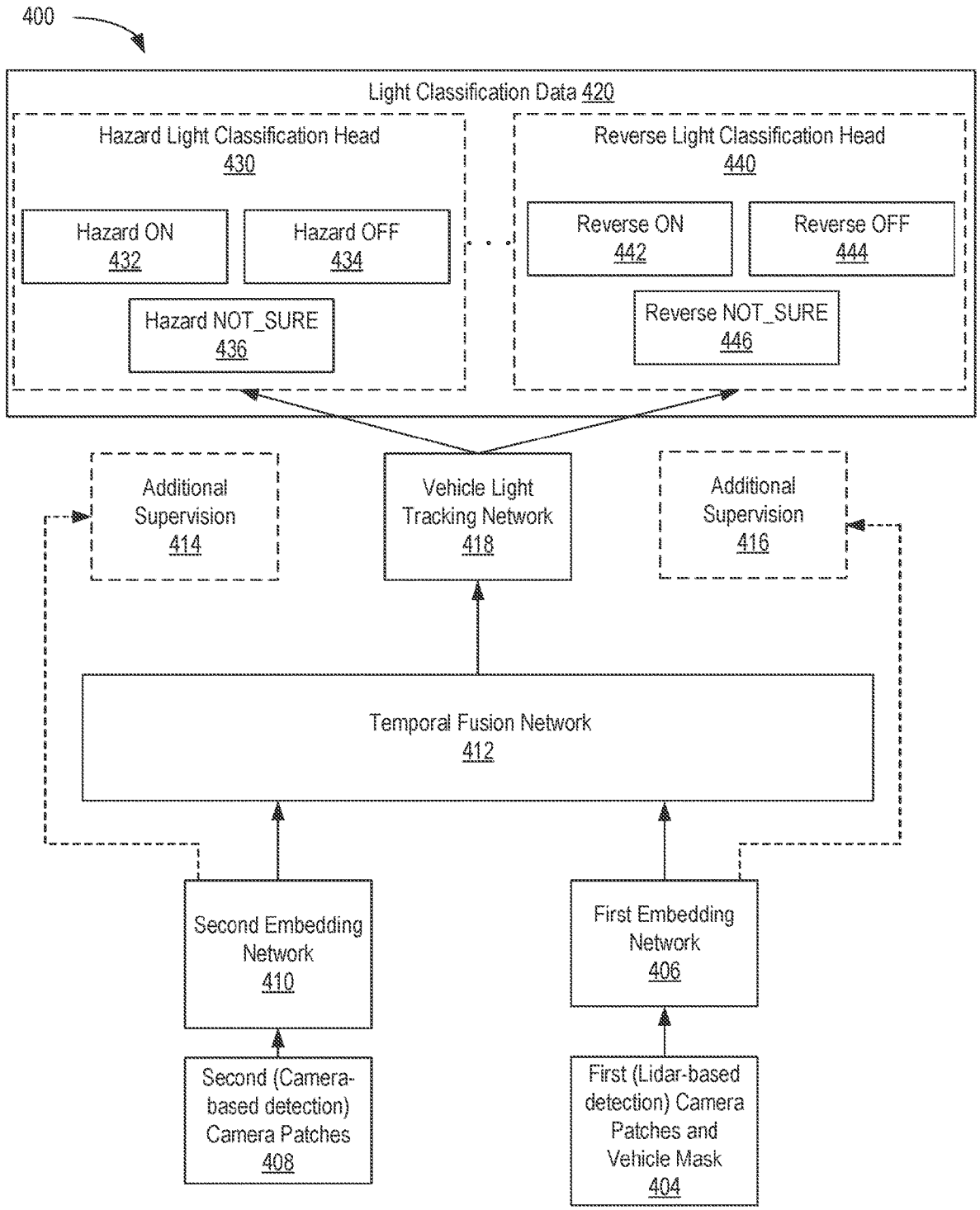
FIG. 4 is a block diagram that illustrates a vehicle light classification system in which implementations of the disclosure may operate.

In some embodiments, the image processor 304 may combine image data from multiple image acquisition devices (e.g., cameras with different fields of view and/or operational specifications) to generate camera patches 306. For example, the sensing system 302 may perform camera-based detection and/or lidar-based detection of a driving environment. Camera-based detection may rely on camera images, while lidar-based detection may rely on lidar data used in conjunction with camera images. For example, image data may be cropped from a low-light high-resolution camera (e.g., for long range capture), and from an auto/dark camera (e.g., for close range capture). In some embodiments, the camera-based detection may operate at a first image acquisition frequency (e.g., 5 Hz) and the lidar-based detection may operate at a second image acquisition frequency (e.g., 10 Hz). FIG. 4 illustrates further embodiments regarding the system architecture and processing methodology for multiple image detection systems and/or methodologies.

As shown in FIG. 3, the camera patches 306 are sent to embedding networks 308. The embedding networks 308 may receive the camera patches 306 and encode the camera patches 306 into encoded image data (e.g., embedded data) on a frame-by-frame basis of the image data. For example, one or more camera patches (e.g., cropped image frames) may be received by individual embedding networks 308 and processed in parallel (e.g., one or more camera patches processed at least partially simultaneously to one or more other camera patches). In some embodiments, the camera patches include a vehicle mask (e.g., generated from lidar points associated with the target vehicle). For example, a vehicle mask may include a first color (e.g., white) inside a contour (e.g., convex hull of the lidar points) of a target vehicle and a second color (e.g., black) indicating the outside of the contour. The vehicle mask may provide one or more other elements that separate the target vehicle from the background (e.g., of the driving environment).

In some embodiments, one or more embedding networks 308 include a feature extractor to generate one or more feature vectors associated with the image data. The feature extractor can dimensionally reduce the camera patch data into groups or features. For example, the feature extractor may generate features that include one or more detected vehicles, vehicle light states, locations of lights, etc. In some embodiments, the feature extractor performs any of partial least squares analysis, principal component analysis, multifactor dimensionality reduction, nonlinear dimensionality reduction, and/or any combination thereof. In some embodiments, the feature extractor is designed for edge detection of the sensing data. For example, the feature extractor includes methodology that aims at identifying sensor data and/or image data that changes sharply and/or that include discontinuities (e.g., the boundaries of vehicle lights within an image frame).

In some embodiments, the feature extractor may make use of a graphical neural network (GNN). The GNN may include a family of models that handle relations between sparse objects in space. Within the GNN, camera patch data may be encoded into feature vectors. The GNN may employ model relations using attention-based interactions. In some embodiments, the feature extractor may make use of a convolutional neural network (CNN). A convolutional neural network (CNN), for example, hosts multiple layers of convolutional filters. Pooling may be performed, and nonlinearities may be addressed, at lower layers, on top of which a multi-layer perceptron is commonly appended, mapping top layer features extracted by the convolutional layers to decisions (e.g., determined feature vectors).

As shown in FIG. 3, one or more outputs from embedding networks 308 is received by temporal fusion network 310. Temporal fusion network 310 aggregates one or more outputs (e.g., feature vectors, embedded image data, embedded camera patches) from embedding networks 308. For example, temporal fusion network 310 may fuse one or more feature vectors into a feature vector unit or set and further process the feature vector unit or set.

The temporal fusion network 310 receives image data (e.g., in the form of feature vectors) from the embedding networks 308. The temporal fusion network determines vehicle light classifications based on the received image data. The temporal fusion network 310 may make individual vehicle light classifications for each individual vehicle within the driving environment. In some embodiments, each vehicle may be associated with multiple vehicle light classifications. As will be discussed further in connection with later embodiments, the temporal fusion network 310 may process the image data using one or more machine learning models (MLMs).

Vehicle light classifications correspond to identifiable configurations and statuses of one or more lights of an associated vehicle. The vehicle light classification may include an indication of any number of light status and configuration combinations such as: flashing lights, hazard lights, reverse lights, headlights, taillights, brake lights, turn signals (e.g., left or right turn signals), among other things. For example, the vehicle light classification may indicate that a first vehicle currently is operating with one flashing light and may further determine that the vehicle is operating with a left turn signal activated. As will be discussed in connection with later embodiments, the various light statuses and configurations may be grouped together based on common attributes of each configuration (e.g., flashing lights and hazard lights may be labelled within the same group).

The light classifications may be output from temporal fusion network 310 as light classification data 314. In some embodiments, the light classification data includes one or more scores associated with one or more light classifications of a network of vehicle light classifications. The one or more scores may be associated with a level of confidence that a vehicle light classification accurately represents a state of a neighboring vehicle in the driving environment of an AV.

FIG. 4 is a block diagram that illustrates a vehicle light classification system 400 in which implementations of the disclosure may operate. The vehicle light classification system 400, may include first camera patches and vehicle mask 404, second cameras patches 408, first embedding network 410, second embedding network 406, temporal fusion network 412, vehicle light tracking network 418, and light classification data 420. The vehicle light classification system 400 may include aspects and/or features of vehicle light classification system 300 of FIG. 3.

As shown in FIG. 4, second embedding network 410 receives second camera patches 408 (e.g., from sensing system 110 of FIG. 1) and first embedding network 406 receives first camera patches and vehicle mask 404. Camera patches may include a sub image and/or processed image that is generated to filter out image data irrelevant to downstream processes (e.g., reduce processing load by unnecessarily processing image data not associated with a neighboring vehicle). The filtering and processing of the image data may be performed upstream from the vehicle light classification system 400 or may be performed by embedding networks 410, 406. For example, the embedding networks 410, 406 may modify raw image data received from a sensing system (e.g., sensing system 110 of FIG. 1) by identifying locations of neighboring vehicles disposed within one or more image frames and removing (e.g., cropping) unneeded image data (e.g. portions of the image not associated with the vehicle). In some embodiments, one or more embedding networks, e.g., first embedding network 406, may receive a vehicle mask (e.g., based on lidar data). The vehicle mask may indicate one or more vehicle boundaries associated with a neighboring vehicle in an environment of an AV. Embedding network 406 may leverage the vehicle mask and identify vehicles from a background of a driving environment. Further lidar data may be leveraged to crop the camera patches. The vehicle mask may be used to identify (e.g., overlay) a vehicle boundary associated with a vehicle indicated in the camera patches. In some embodiments, a vehicle mask is concatenated with the camera patch as the input to the first (lidar-based detection) embedding network.

As shown in FIG. 4, vehicle light classification system 400 may include multiple embedding networks (e.g., embedding networks 410, 406). In some embodiments, each embedding network and data throughput (e.g., camera patches 408, 404) may be associated with unique data and/or processing techniques. For example, a second embedding network 410 may be associated with processing image data associated with camera-based detection. The camera patches 408 may include one or more image frames associated with a camera based detection of the driving environment of the AV. In another example, a first embedding network 406 may be associated with processing image data associated with lidar-based detection (e.g., using a vehicle mask based on lidar data). In some embodiments, camera patches 408 may be acquired using a high resolution camera (HRC) and/or high resolution cameras for dark detection (HRCD). In some embodiments, camera patches 404 may be acquired from surround view camera (SVC) and/or surround view camera for dark detection (SVCD). For example, SVCD and SVC may capture similar images that appear darker when captured by SVCD compared to SVC. Similarly, HRCD and HRC may capture similar images that appear darker when captured by HRCD compared to HRC. Capturing images that appear darker can be facilitated with filters that eliminate a part of incoming light.

As shown in FIG. 4, temporal fusion network 412 receives outputs from the various embedding networks 406, 410. The outputs may include scene encoded data (e.g., embedded camera patches, feature vectors, embedded image data). The one or more outputs may include feature vectors corresponding to a common vector basis. For example, as noted previously, the embedding networks 410, 406 may generate feature vector (e.g., of a common vector basis) using camera patches 408, 404 with diverse features (e.g., camera-based detection, lidar-based detection, capture using HRC, captured using SVC, and so on). The temporal fusion network 412 aggregates one or more outputs (e.g., feature vectors, embedded image data) from embedding networks 406, 410. For example, temporal fusion network 412 may fuse one or more feature vectors into a feature vector unit or set. In another example, the temporal fusion network 412 may associate feature vectors temporally (e.g., feature vectors associated with a series of temporally related image frames acquired from the same and/or different sensors). The temporal data fuser may combine one or more feature vectors to generate feature vector units including a plurality of associated feature vectors. The temporal fusion network 412 outputs data (e.g., feature vector units or sets) to vehicle light tracking network 418.

The vehicle light tracking network 418 receives image data (e.g., in the form of feature vector units or sets) from the temporal fusion network 412. The vehicle light tracking network 418 determines vehicle light classifications based on the received image data. The vehicle light tracking network 418 may make individual vehicle light classifications for each individual vehicle within the driving environment. In some embodiments, each vehicle may be associated with multiple vehicle light classifications. The vehicle light tracking network 418 may process the image data using one or more machine learning models (MLMs). The vehicle light tracking network 418 may include aspects and/or features of temporal fusion network 310 of FIG. 3.

Vehicle light classifications correspond to identifiable configurations and statuses of one or more lights of an associated vehicle. The vehicle light classifications may include an indication of any number of light status and configuration combinations such as: flashing lights, hazard lights, reverse lights, headlights, taillights, brake lights, turn signal (e.g., left or right turn signals), among other things. For example, the vehicle light classification may indicate a first vehicle is currently operating with one flashing light or a determination that the first vehicle is operating with a left turn signal activated. As will be discussed in later embodiments, the various light status and configurations may be grouped together based on common attributes of each configuration (e.g., flashing lights and hazard lights may be labelled within the same group).

The vehicle light tracking network outputs light classification data 420. In some embodiment, the light classification data 420 includes one or more scores associated with one or more light classifications of a network of vehicle light classifications. The one or more scores may be associated with a level of confidence that a vehicle light classification accurately represents a state of a neighboring vehicle in the driving environment of an AV.

The light classification data 420 may include one or more classification heads 430, 440. Each classification head 430, 440 may be associated with a light status and configuration. For example, hazard light classification head 430 is associated with predictions, scores, and/or confidence levels associated with hazard lights of a neighboring vehicle. Each classification head 430 may include one or more potential inferences and corresponding scores. For example, hazard light classification head 430 may include an inference for hazard lights being activated (e.g., Hazard ON 432), an inference for the hazard lights not being activated (e.g., Hazard OFF 434), and an inference for uncertainty in whether the hazard light are on or off (e.g., Hazard NOT_SURE 436). Each of these inference data points may include a level of confidence (e.g., a score) associated with each potential inference. In some embodiments, a "NOT_SURE" determination may be a positive determination (e.g., instead of a state of uncertainty or lack of confidence). For example, a portion of a vehicle may be occluded and the system may detect the occlusion and positively determine that the system is incapable of identifying whether the lights are on or off.

In another example, the light classification data may include reverse light classification head 440. The reverse light classification head may make similar inferences as the hazard light classification head 430. For example, whether the reverse lights are on (e.g., Reverse ON 442), off (e.g., Reverse OFF 44), or unsure (e.g., Reverse NOT_SURE 446). The light classification data may include a classification head for other light statuses and configuration such as: flashing lights, hazard lights, reverse lights, headlights, taillights, brake lights, turn signal (e.g., left or right turn signals), among others.

In some embodiments, one or more of image processor 304, embedding networks 308, temporal fusion network 310 of FIG. 3 and/or embedding networks 410, 406, temporal fusion network 412, and/or vehicle light tracking network 418 perform one or more of the functions described herein. For example, each previously identified system may include one or more machine learning models and may be trained individually or collectively. For example, each of embedding network 410 and embedding network 406 may undergo additional supervision 414 and 416, respectively.

In embodiments, one or more machine learning models are trained to perform one or more of the tasks described below. Each task may be performed by a separate machine learning model. Alternatively, a single machine learning model may perform each of the tasks or a subset of the tasks. Additionally, or alternatively, different machine learning models may be trained to perform different combinations of the tasks. In an example, one or a few machine learning models may be trained, where the trained ML model is a single shared neural network that has multiple shared layers and multiple higher level distinct output layers, where each of the output layers outputs a different prediction, classification, identification, etc. The tasks that the one or more trained machine learning models may be trained to perform are as follows:

a. Image data processor (e.g., image processor 304, embedding networks 410, 406)—The data processor receives sensor data (e.g., radar, lidar, camera images, etc.) indicative of a state of a driving environment. The data processor may process the received data to generate camera patches. The data processor may perform one or more image data processes such as image downsampling, image filtering, image cropping, object detection, occlusion detection, and the like. For example, the data processor may leverage a vehicle mask for separating a target vehicle from an environment background within an image. The data processor may further detect a vehicle (e.g., using lidar based detection or camera-based detection) and determine boundaries of vehicles and further perform image cropping based on the determined vehicle boundaries.

b. Data encoder (e.g., embedding network 308, 410, 406)—Data encoder receives camera patches and/or sensor data (e.g., radar, lidar, camera images, etc.) indicative of a state of a driving environment. Data encoder generates encoded data associated with combination, correlations, and/or artificial parameters of the received camera patches. Data encoder can dimensionally reduce (e.g., classify) the sensor data into groups or features. For example, the data encoder may generate scene encoded data (e.g., feature vectors) that identify one or more artificial parameters for classifying vehicle lights in a driving environment. Data encoder can process the camera patches frame by frame for individually encoded image frame data.

c. Temporal data fuser (e.g., temporal fusion networks 310, 412)—Receive one or more feature vectors and associate one or more feature vectors with one or more other feature vectors. For example, the temporal data fuser may associate feature vectors temporally (e.g., feature vectors associated with a series of temporally related image frames acquired from the same and/or different sensors). The temporal data fuser may combine (e.g., using concatenation) one or more feature vectors to generate feature vector units or sets including a plurality of associated feature vectors.

d. Vehicle light classifier (e.g., temporal fusion network 310, vehicle light tracking network 418)—Receive image data (e.g., raw image data, encoded image data, and/or fused image data) such as feature vectors and/or feature vector units. The vehicle light classifier classifies configurations and statuses of one or more lights of neighboring vehicle in a driving environment associated with the received image data. The vehicle light classification may include an indication of any number of light status and configuration combinations such as: flashing lights, hazard lights, reverse lights, headlights, taillights, brake lights, turn signal (e.g., left or right turn signals), among others.

One type of machine learning model that may be used to perform some or all of the above tasks is an artificial neural network, such as a deep neural network or a graph neural network (GNN). Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In a vehicle light classifier, for example, the raw input (e.g., into the first set of layers) may be sensor data associated with a state of a driving environment; a second set of layers may compose processed image data (e.g., camera patches); a third set of layers may include encoded image data (e.g., feature vectors) associated with a state of a driving environment. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, one type of deep learning model that may be used includes transformers or vision transformers (ViT)). A transformer is a deep learning model that adopts the mechanism of attention (e.g., enhancing important parts of the input data and fading out or de-emphasizing other parts of the input data), differentially weighting the significance of each part of the input data. Similar to RNNs, transformers are designed to handle sequential input data, such as image data (e.g., camera patches) described herein. However, unlike RNNs, transformers do not necessarily process the data in order. Rather, the attention mechanism provides context for any position in the input sequence. In a transformer, the image data (e.g., camera patches) are not required to be processed sequentially but can be marked using attention-based indicators that provide a context to the currently processed frame. For example, by not requiring a sequential limitation to the processing of image frames, the image frames can be processed in parallel, e.g., using a series of networks (such as embedding networks 308 of FIG. 3) to obtain classifications can be fused together (e.g., using temporal fusing network 310 of FIG. 3).

In some embodiments, a vision transformer (ViT) is used. A ViT includes a vision model based on conventional transformer based architecture originally designed for text-based tasks. ViT represents an input image as a sequence of image patches, similar to the sequence of word embeddings used when applying transformers to text, and directly predicts class labels for the image. ViT divides an image into a grid of square patches. Each patch is flattened into a single vector by concatenating the channels of all pixels in a patch and then linearly projecting the resulting concatenation to the desired input dimension. In a ViT, learnable position embeddings may be associated with each camera patch, which can allow the model to learn about the structure of the images. In some embodiments, the ViT may not inherently know about the relative location of patches within an image. However, the ViT may learn such relevant information from the training data and encode structural information in the position embedding(s).

In one embodiment, one or more machine learning models is a recurrent neural network (RNN). An RNN is a type of neural network that includes a memory to enable the neural network to capture temporal dependencies. An RNN is able to learn input-output mappings that depend on both a current input and past inputs. The RNN will address past and future encoded image data (e.g., feature vectors) and make predictions based on this continuous metrology information (e.g., status and configuration of vehicle lights of neighboring vehicles in a driving environment). RNNs may be trained using a training dataset to generate a fixed number of outputs (e.g., to estimate candidate driving paths and/or predict future lane states). One type of RNN that may be used is a long short-term memory (LSTM) neural network.

Training of a neural network may be achieved in a supervised learning manner, which involves feeding a training dataset consisting of labeled inputs through the network, observing its outputs, defining an error (by measuring the difference between the outputs and the label values), and using techniques such as deep gradient descent and back-propagation to tune the weights of the network across all its layers and nodes such that the error is minimized. In many applications, repeating this process across the many labeled inputs in the training dataset yields a network that can produce correct output when presented with inputs that are different from the ones present in the training dataset.

Training of the one or more machine learning models may be performed using one or more training datasets containing a number (e.g., hundreds, thousands, millions, tens of millions or more) of sensor measurements (e.g., received from sensing system 110). In some embodiments, the training dataset may also include associated camera patches (e.g., cropped image data) for forming a training dataset, where each input data point is associated with camera patches. The machine learning models (e.g., associated with data image processor 304) may be trained, for example, to generate outputs indicating camera patches associated with sensor data corresponding to a state of a driving environment.

For the model training of the one or more machine learning models, a training dataset containing hundreds, thousands, millions, tens of millions or more of sensor measurements (e.g., received from sensing system 110) and/or camera patches (e.g., received from image processor 304) may be used to form one or more training datasets. In embodiments, the training dataset may also include associated scene encoded data (e.g., feature vectors) for forming a training dataset, where each input data point is associated with encoded scene data (e.g., a feature vector) or classifications of one or more types of useful information (e.g., types of vehicle such as bus, emergency vehicle, truck, bicycle, motorcycle, etc.; vehicle locations, make and/or model of vehicles, etc.). The machine learning models (e.g., associated with embedding network(s) 308) may be trained, for example, to generate outputs indicating scene encoded data (e.g., feature vectors) associated with sensor data, and/or camera patches corresponding to a state of a driving environment.

In some embodiments, a training dataset containing hundreds, thousands, millions, tens of millions or more scene encoded data (e.g., feature vectors) is used to form a training dataset. The training data set may also include an associated set of fused scene encoded data (e.g., temporally fused data or feature vector sets or units). The machine learning models (e.g., associated with temporal fusion network 310) may be trained, for example, to generate outputs indicating one or more temporally fused scene encoded data or feature vectors sets associated with the encoded scene data.

In some embodiments, a training dataset containing hundreds, thousands, millions, tens of millions or more scene encoded data (e.g., feature vectors) and/or temporally fused scene encoded data (e.g., feature vector sets) is used to form a training dataset. The training data set may also include an associated set of vehicle light classification data. The machine learning models (e.g., associated with temporal fusion network 310) may be trained, for example, to generate outputs indicating one or more vehicle light classifications associated with the encoded scene data and/or fused scene encoded data.

To effectuate training, processing logic inputs the above described training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the training datasets into the machine learning model one at a time. The machine learning model processes the input to generate an output. An artificial neural network includes a first set of layers that consists of values in a data point. The next set of layers is called a set of hidden layers, and nodes within the hidden layers each receive one or more of the input values. Each node contains parameters (e.g., weights, biases) to apply to the input values. Each node therefore essentially inputs the input values into a multivariate function (e.g., a non-linear mathematical transformation) to produce an output value. A next set of layers may be another set of hidden layers or a set of output layers. In either case, the nodes at the next set of layers receive the output values from the nodes at the previous layer, and each node applies weights to those values and then generates its own output value. This may be performed at each layer. A final set of layers is the output set of layers, where there is one node for each class, prediction and/or output that the machine learning model can produce.

Accordingly, the output may include one or more predictions or inferences. For example, an output prediction or inference may include camera patches, scene encoded data, temporally fused scene encoded data, and/or vehicle light classifications. Processing logic may then compare the predicted or inferred output to one or more ground truth measurements (e.g., observed vehicle light status and/or configurations) that may be included in the training data item. Processing logic determines an error (i.e., a classification error) based on the differences between the output of a machine learning model and the known classification (e.g., a predicted vehicle light classification and an observed vehicle light classification). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives, as input, values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the deep learning model. After one or more rounds of training, processing logic may determine whether a stopping criterion has been met. A stopping criterion may be a target level of accuracy, a target number of processed images from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

As an example, in one embodiment, a machine learning model (e.g., vehicle lights classifier) is trained to determine vehicle light classifications. A similar process may be performed to train machine learning models to perform other tasks such as those set forth above. A set of many (e.g., thousands to millions) driving environment image and/or sensor data points may be collected and vehicle light classifications associated with the target candidate locations may be determined.

Once one or more trained machine learning models are generated, they may be stored in model storage (e.g., data repository 250 of FIG. 2), Processing logic associated with an AV may then use the one or more trained ML models as well as additional processing logic to implement an automatic mode, in which user manual input of information is minimized or even eliminated in some instances. For example, processing logic associated with an AV may initiate use of the one or more ML models and make AV navigation decisions based on the one or more outputs of the ML models.

Figure 5A:
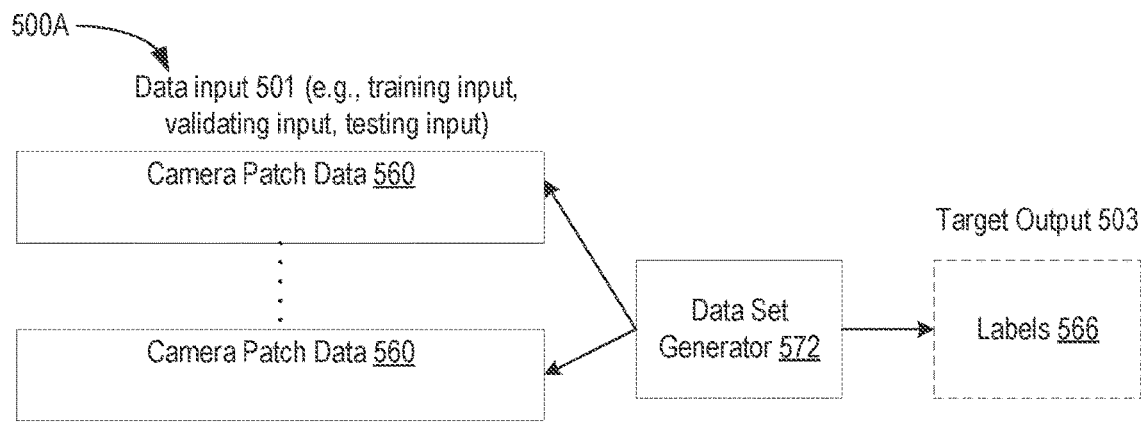
FIG. 5A is an example data set generator to create data sets for a machine learning model using image data, according to certain embodiments.

FIG. 5A is an example data set generator 572 (e.g., data set generator 572 of FIG. 2) to create data sets for a machine learning model (e.g., one or of the MLMs described herein) using image data 560 (e.g., images captured by cameras 118 of FIG. 1), according to certain embodiments. System 500A of FIG. 5A shows data set generator 572, data inputs 501, and target output 503.

In some embodiments, data set generator 572 generates a data set (e.g., training set, validating set, testing set) that includes one or more data inputs 501 (e.g., training input, validating input, testing input). In some embodiments, the data set further includes one or more target outputs 503 that correspond to the data inputs 501. The data set may also include mapping data that maps the data inputs 501 to the labels 566 of a target output 503. Data inputs 501 may also be referred to as "features," "attributes," or information." In some embodiments, data set generator 572 may provide the data set to the training engine 582, validating engine 584, and/or testing engine 586, where the data set is used to train, validate, and/or test a machine learning model.

In some embodiments, data set generator 572 generates the data input 501 based on image data 560. In some embodiments, the data set generator 572 generates the labels 466 (e.g., flashing light data 612, hazard light data 614, reverse light data 622, headlight data 624, taillight data 626, brake light data 628, left turn light data 632, right turn light data 634) associated with the image data 560. In some instances, labels 566 may be manually added to images by users (e.g., label generation 644 of FIG. 6). In other instances, labels 566 may be automatically added to images (e.g., using labeling database 642 of FIG. 6).

In some embodiments, data inputs 501 may include one or more images (e.g., a series of image frames) for the image data 560. One or more frames of the image data 560 may include one or more neighboring vehicles (e.g., operating with one or more light status and configurations or vehicle light classifications).

In some embodiments, data set generator 572 may generate a first data input corresponding to a first set (e.g., data group 610, 620, 630) of features to train, validate, or test a first machine learning model and the data set generator 572 may generate a second data input corresponding to a second set of features to train, validate, or test a second machine learning model.

In some embodiments, the data set generator 572 may discretize one or more of the data inputs 501 or the target outputs 503 (e.g., to use in classification algorithms for regression problems). Discretization of the data input 501 or target output 503 may transform a continuous series of image frames into discrete frames with identifiable features (e.g., feature vectors). In some embodiments, the discrete values for the data input 301 indicate neighboring vehicles and/or light statuses and configuration of neighboring vehicles.

Data inputs 501 and target outputs 503 that are being used to train, validate, or test a machine learning model may include information for a driving environment. For example, the image data 560 and labels 566 may be used to train a system for a particular driving environment (e.g., local driving laws, unique local object detection, and the like).

In some embodiments, the information used to train the machine learning model may be from specific types of vehicle light classifications having specific characteristics and allow the trained machine learning model to determine outcomes for a specific group of vehicle lights (e.g., data group 610, data group 620, data group 630) based on input for image data 560 associated with one or more components sharing characteristics of the specific group. In some embodiments, the information used to train the machine learning model may be for data points from two or more vehicle light classifications and may allow the trained MLM to determine multiple output data points from the same image (e.g., determine a vehicle is operating with multiple vehicle light configurations). For example, a MLM model may infer that a vehicle has one or more tail lights activated and may further infer that the vehicle has activated a turn signal.

In some embodiments, subsequent to generating a data set and training, validating, or testing machine learning model(s) using the data set, the machine learning model(s) may be further trained, validated, or tested (e.g., with further image data and labels) or adjusted (e.g., adjusting weights associated with input data of the machine learning model 290, such as connection weights in a neural network).

Figure 5B:
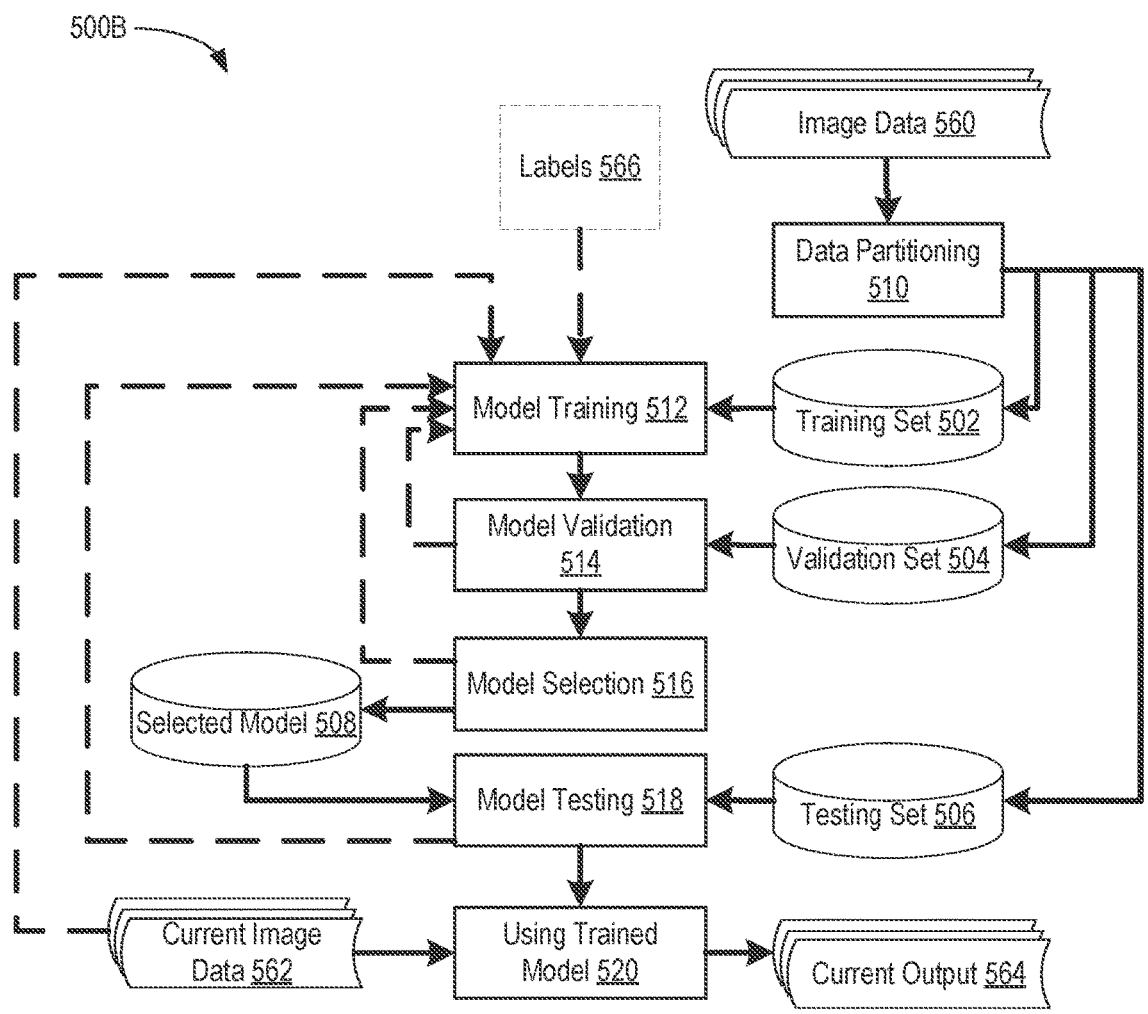
FIG. 5B is a block diagram illustrating a system for training a machine learning model to generate outputs, according to certain embodiments.

FIG. 5B is a block diagram illustrating a system 500B for training a machine learning model to generate outputs 564 (e.g., encoded scene data, camera patches, feature vectors, vehicle light classifications), according to certain embodiments. The system 500B may be used to train one or more machine learning models to determine outputs associated with image data (e.g., images acquired using cameras 118).

At block 510, the system 500B performs data partitioning (e.g., via data set generator 572) of the image data 560 (e.g., series of image frame, camera patches, and in some embodiments labels 566) to generate the training set 502, validation set 504, and testing set 506. For example, the training set 502 may be 60% of the image data 560, the validation set 504 may be 20% of the image data 560, and the testing set 506 may be 20% of the image data 560. The system 500B may generate a plurality of sets of features for each of the training set 502, the validation set 504, and the testing set 506.

At block 512, the system 500B performs model training using the training set 502. The system 500B may train one or multiple machine learning models using multiple sets of training data items (e.g., each including sets of features) of the training set 502 (e.g., a first set of features of the training set 502, a second set of features of the training set 502, etc.). For example, system 500 may train a machine learning model to generate a first trained machine learning model (e.g., first embedding network 410) using the first set of features in the training set (e.g., camera patches 408) and to generate a second trained machine learning model (e.g. second embedding network) using the second set of features in the training set (e.g., camera patches 404, lidar mask 402). The machine learning model(s) may be trained to output one or more other types of predictions, classifications, decisions, and so on. For example, the machine learning model(s) may be trained to classify vehicle light of a neighboring vehicle in a driving environment of an AV corresponding to the image data 560.

Processing logic determines if a stopping criterion is met. If a stopping criterion has not been met, the training process repeats with additional training data items, and another training data item is input into the machine learning model. If a stopping criterion is met, training of the machine learning model is complete.

In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap.

At block 514, the system 500B performs model validation (e.g., via validation engine 284 of FIG. 2) using the validation set 504. The system 500B may validate each of the trained models using a corresponding set of features of the validation set 504. For example, system 400 may validate the first trained machine learning model using the first set of features in the validation set (e.g., feature vectors form a first embedding network) and the second trained machine learning model using the second set of features in the validation set (e.g., feature vectors from a second embedding network).

At block 514, the system 500 may determine an accuracy of each of the one or more trained models (e.g., via model validation) and may determine whether one or more of the trained models has an accuracy that meets a threshold accuracy. Responsive to determining that one or more of the trained models has an accuracy that meets a threshold accuracy, flow continues to block 516. In some embodiments, model training at block 512 may occur on-board an AV system. For example, training of the one or more machine learning models may occur while an AV is navigating a driving environment.

At block 518, the system 500B performs model testing using the testing set 506 to test the selected model 508. The system 500B may test, using the first set of features in the testing set (e.g., feature vectors from a first embedding network), the first trained machine learning model to determine the first trained machine learning model meets a threshold accuracy (e.g., based on the first set of features of the testing set 506). Responsive to accuracy of the selected model 508 not meeting the threshold accuracy (e.g., the selected model 508 is overly fit to the training set 502 and/or validation set 504 and is not applicable to other data sets such as the testing set 506), flow continues to block 512 where the system 500 performs model training (e.g., retraining) using further training data items. Responsive to determining that the selected model 508 has an accuracy that meets a threshold accuracy based on the testing set 506, flow continues to block 520. In at least block 512, the model may learn patterns in the image data 560 to make predictions and in block 518, the system 500 may apply the model on the remaining data (e.g., testing set 506) to test the predictions.

At block 520, system 500B uses the trained model (e.g., selected model 508) to receive current data (e.g., current image data) and receives a current output 564 based on processing of the current image data 562 by the trained model(s) 520.

In some embodiments, outputs 564 corresponding to the current data 562 are received and the model 508 is re-trained based on the current data 562 and the outputs 564.

In some embodiments, one or more operations of the blocks 510-520 may occur in various orders and/or with other operations not presented and described herein. In some embodiments, one or more operations of blocks 510-520 may not be performed. For example, in some embodiments, one or more of data partitioning of block 510, model validation of block 514, model selection of block 516, or model testing of block 518 may not be performed.

Figure 6:
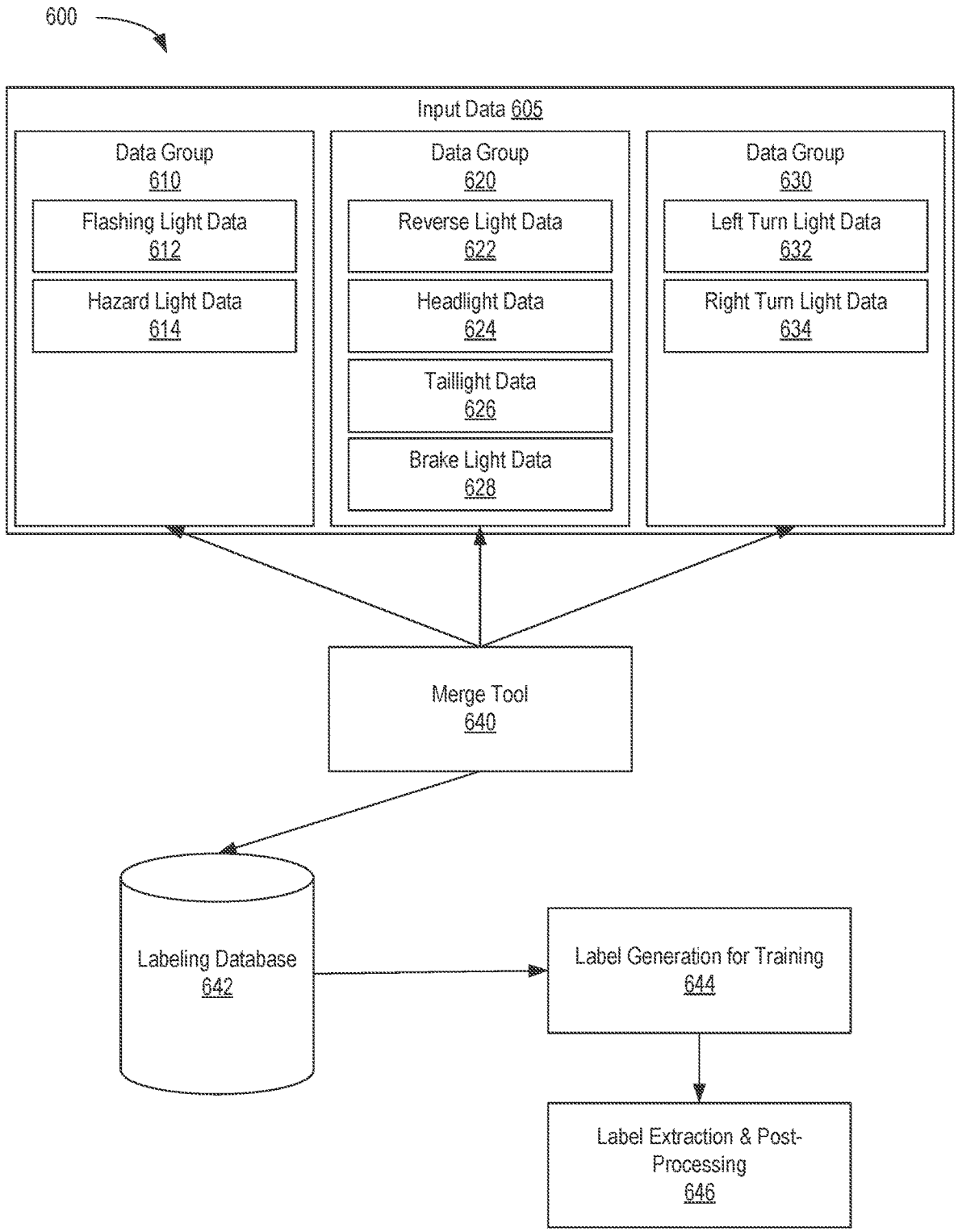
FIG. 6 is a block diagram illustrating a system for labeling training data for vehicle light classifications, according to certain embodiments.

FIG. 6 is a block diagram illustrating a system 600 for labeling training data for vehicle light classifications, according to certain embodiments. System 600 aggregates and extracts input data 605 for use in training the one or more machine learning model described herein. Input data 605 may include one or more groupings of vehicle light data (e.g., data group 610, data group 620, data group 630). The training dataset may also include mapping data that maps the data inputs (e.g., image data) to individual vehicle light data (e.g., flashing light data 612, hazard light data 614, reverse light data 622, headlight data 624, taillight data 626, brake light data 628, left turn light data 632, and/or right turn light data 634) of a target output. The data groups (e.g., data groups 610, 620, 630) may be organized based on common features, attributes, and/or information.

System 600 receives input data (e.g., entered manually in association with image data) and aggregates the data into groups and extracts labels for use in the one or more machine learning models described herein. System 600 includes a merge tool 640 capable of merging received input data. In some embodiments, the input data 605 is received group by group. Generating training data may be performed selectively based on the group of data desired to be entered. For example, a set of images may be presented to users with a specific question such as whether the hazard lights are on or off, whether the turn signal is on or off, whether the reverse lights are on or off, and so forth. In some embodiments the vehicle light data (e.g., e.g., flashing light data 612, hazard light data 614, reverse light data 622, headlight data 624, taillight data 626, brake light data 628, left turn light data 632, and/or right turn light data 634) may include a selection of options (e.g., ON or OFF), however, in other embodiments more than a binary selection of options may be utilized (e.g., ON, OFF, NOT_SURE, etc.).

The merge tool 640 may include processing logic to associate image data corresponding to common image data together to form a common data group or joint label. For example, data from a first data group 610 can be selectively merged with data in a second data group 620. The merged data may be stored in labeling database 642. Labeling database 642 may include one or more features, aspects, and/or details associated with data repository 250 of FIG. 2. Labeling of input data among different groups can be based on various attributes of different lights. For example, one group can include lights that are used in abnormal road situations (e.g., data group 610), such as flashing lights, hazard lights, oversized load lights, etc., Another group (e.g., data group 620) can include lights that typically operate in a steady mode, e.g., one or several seconds at least, such as headlights, tail lights, reverse lights, brake lights, truck marker light, etc. Yet another group (e.g., data group 630) can include lights that are used under normal driving conditions but operate in a dynamic mode, e.g., turning lights, etc. It should be understood that data groups illustrated in FIG. 6 are intended as illustration and that various other groups (e.g., lights used in trucking operations, emergency vehicle operations, etc.) can be additionally (or alternatively) defined.

At block 644, system 600 may generate labels for training. During the labeling of the input data, each group may be labeled independently from labeling of other groups. In some embodiments, the input data is labeled group by group. System 600 may selectively request input from one or more data groups 610, 620, 630 (e.g., based on a representation of each individual data group in a training dataset). For example, generation of training data may include obtaining image data at random and labeling the data accordingly. However, some driving environment conditions (e.g., emergency vehicle response light, bus stopping lights, etc.) may occur less frequently. In such instances, system 600 may request further input data generation associated with data groups that are underrepresented. For example, system 600 may process and request input (e.g., user input or automatic inference) for a specific group (e.g., the presence of an emergency vehicle and whether the emergency response lights are activated).

At block 646, system 600 performs label extraction and post-processing. Label extraction may include extracting labels from label database 642. In some embodiments, system 600 performs a cleaning procedure of the data labels. The cleaning procedure may include cropping and/or filtering image data to emphasize individual data labels. For example, an image including hazard lights of a vehicle may be cropped to show only the vehicle's hazard lights. In another example, a series of image frames may be filtered to remove image frames obtained immediately prior or after the use of the vehicle's hazard lights.

In some embodiments, system 600 may perform label cross check procedures to validate training data. A label cross check procedure may include labeling logic associated with patterns and/or logical requirement associated with the vehicle light data (e.g., flashing light data 612, hazard light data 614, reverse light data 622, headlight data 624, taillight data 626, brake light data 628, left turn light data 632, and/or right turn light data 634). For example, labeling logic may include a provision that when a left turn signal or a right turn signal is active (ON), a vehicle flashing lights must be active (ON). System 600 may leverage labeling logic to filter training data failing to meet labeling logic requirements.

In some embodiments, system 600 may perform label adjustments (e.g., for compound labels and/or combinations of light configurations) according to labeling logic. For example, system 600 may receive a label indicating a first vehicle's left turn signal is ON. The system 600 may also receive a label indicating the first vehicle's right turn signal is ON. The system may label the first vehicle as left turn signal OFF, right turn signal OFF, hazard lights ON. In another example, if the left turn signal is labeled as ON and the right turn signal is labeled is NOT_SURE, the system may update the left turn signal label to NOT_SURE and update the right turn signal to OFF.

In some embodiments, system 600 performs multi-label creation. The one or more MLMs may be trained as a multi-class, multi-label classification problem. For example, the left turn signal and the taillight can both be on. The system 600 may aggregate multiple labels for a given image frame and/or series of image frames.

Figure 7:
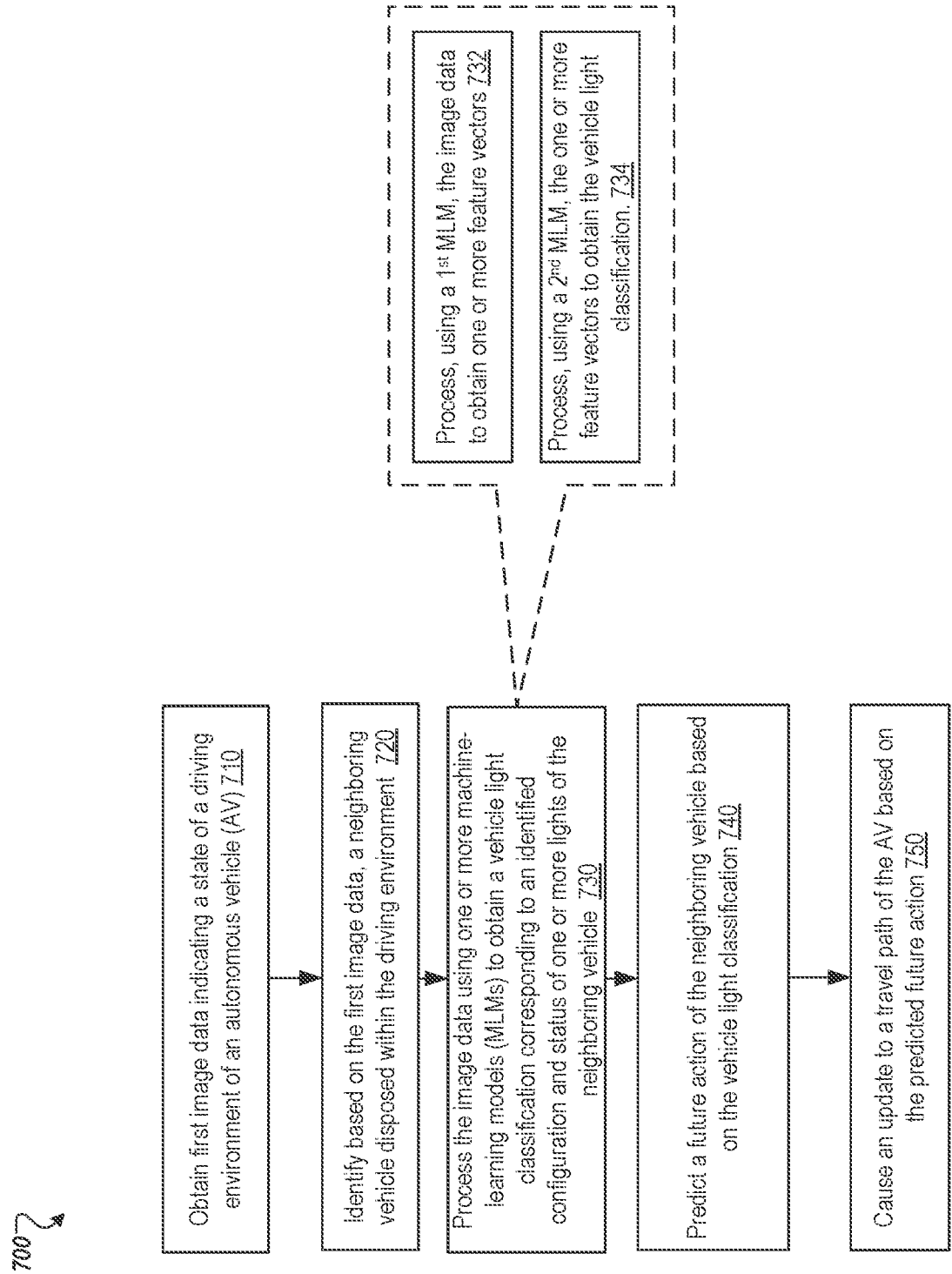
FIG. 7 depicts a flow diagram of one example method for classifying vehicle lights of a neighboring vehicle in a driving environment of an AV, in accordance with some implementations of the present disclosure.

FIG. 7 depicts a flow diagram of one example method 700 for classifying vehicle lights of a neighboring vehicle in a driving environment of an AV, in accordance with some implementations of the present disclosure. A processing device, having one or more processing units (CPUs), and or graphics processing units (GPUs) and memory device communicatively coupled to the CPU(s) and/or GPU(s), can perform method 700 and/or each of its individual functions, routines, subroutines, or operations. The processing device executing method 700 can perform instructions issued by various components of the perception system 130 of FIG. 1, e.g., LCM 132. Method 700 can be directed to systems and components of an autonomous driving vehicle, such as the autonomous vehicle 100 of FIG. 1. Method 700 can be used to improve performance of the autonomous vehicle data process system ing and/or autonomous vehicle control system 140.

In certain implementations, a single processing thread can perform method 700. Alternatively, two or more processing threads can perform method 700, each thread executing one or more individual functions, routines, subroutines, or operations of the methods. In an illustrative example, the processing thread implementing method 700 can be synchronized (e.g., using semaphores, critical sections, and/or other thread synchronization mechanisms). Alternatively, the processing threads implements method 700 can be executed asynchronously with respect to each other. Various operations of method 700 can be performed in a different order compared with the order shown in FIG. 7. Some operations of method 700 can be performed concurrently with other operations. Some operations can be optional.

At block 710, method 700 can include obtaining, e.g., by a processing device of the data processing system of an AV, image data indicating a state of a driving environment of an autonomous vehicle (AV). In some implementations, the image data includes data associated with one or more neighboring vehicles disposed in a driving environment of the AV. In some embodiments, the image data may include a first set of image frames associated with a first field of view and a second set of image frames associated with a second field of view of the driving environment. In some embodiments, the image data may include a first set of image frames captured with an HRC and a second set of image frames captured with a SVC.

At block 720, method 700 can continue with the processing device identifying, based on the first image data, a neighboring vehicle disposed within the driving environment. The processing device may leverage object detection software to determine the presence of one or more neighboring vehicles in the driving environment. For example, the image data may be input into a machine learning model that outputs indicative of detected objects in the driving environment where one of the detected objects includes the neighboring vehicle.

In some embodiments, the processing device receives lidar data associated with the state of the driving environment. The processing device may determine one or more vehicle boundaries of the neighboring vehicles corresponding to the image data based on the lidar data. The processing device may filter the image data based on the determined one or more vehicle boundaries. For example, the processing device may crop individual image frames and remove portions of the image data not associated with the neighboring vehicles.

At block 730, method 700 can continue with processing the image data using one or more machine-learning models (MLMs) to obtain a vehicle light classification corresponding to an identified configuration and status of one or more lights of the neighboring vehicle. In some implementations, the classification measure can be a series of binary values associated with a network of vehicle configuration and statuses (e.g., 0 or 1, YES, or NO, etc.). In some embodiments, the classification may include more than binary values (e.g., YES, NO, and NOT_SURE). An exemplary vehicle light classification may include: Flashing: ON; Hazard: OFF; Reverse: OFF; Headlight: OFF; Taillight: ON; Brake: NOT_SURE; Left Turn: ON; Right Turn: OFF.

The callout portion of FIG. 7 illustrates operations that can be performed as part of block 730. More specifically, at block 732, method 700 can include processing, using a first MLM of the one or more MLMs, to obtain one or more feature vectors. At block 734 method 700 can include processing, using a second of the one or more MLMs, the one or more feature vectors to obtain the vehicle light classification. In some implementations, each of the first MLM and the second MLM can include one or more convolutional neuron layers. The feature vectors can characterize a portion of the camera image associated with the neighboring vehicle.

At block 740, the processing device performing method 700 can predict a future action of the neighboring vehicle based on the vehicle light classification. For example, the vehicle light classification may indicate that the neighboring vehicle has currently activated a turn signal associated with a first direction. The processing device may predict that the vehicle may navigate along a current trajectory and imminently alter the navigation path along the turning direction associated with turn signal. In another example the vehicle light classification may indicate a vehicle currently has brakes lights activated. The processing device may determine the speed of the vehicle may imminently be reduced.

At block 750, the processing device performing method can cause an update to a travel path of the AV based on the predicted future action. For example, the processing device may determine that a vehicle is changing lanes based on a turn signal vehicle light classification. The processing device may cause the AV to slow down or change lanes in response to determining that the neighboring vehicle is changing lanes in front of the AV. In another example the processing device may cause the AV to slow down or change lanes responsive to the processing device determining that a neighboring vehicle located in front of the AV activated its brake lights and is reducing its speed.

Figure 8:
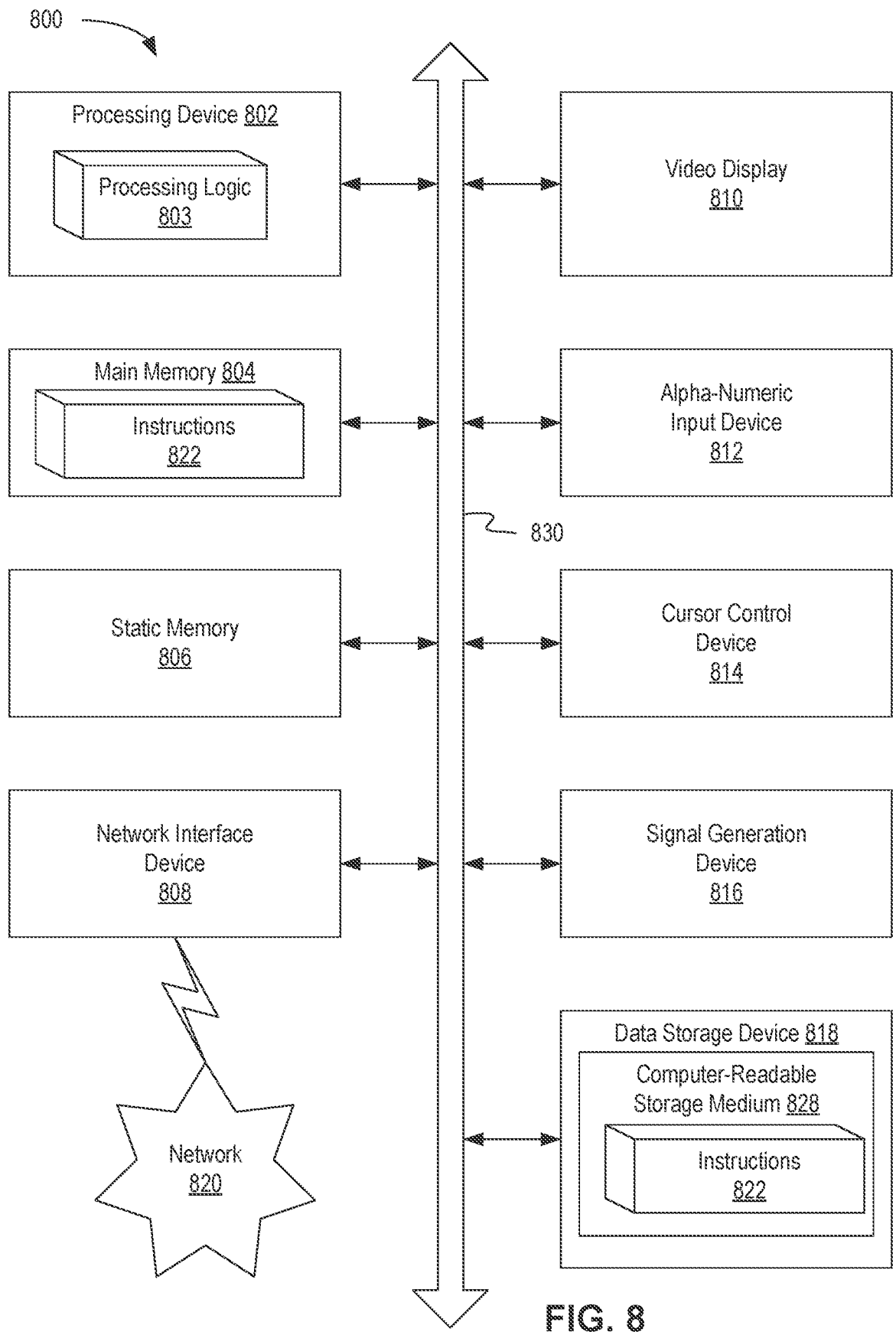
FIG. 8 depicts a block diagram of an example computer device 800 capable of vehicle light classifications in autonomous driving environments, in accordance with some implementations of the present disclosure.

FIG. 8 depicts a block diagram of an example computer device 800 capable of vehicle light classifications in autonomous driving environments, in accordance with some implementations of the present disclosure.

Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which can communicate with each other via a bus 830.

Processing device 802 (which can include processing logic 803) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 can be configured to execute instructions performing method 700 of classifying vehicle lights using machine-learning models in autonomous vehicle applications.

Example computer device 800 can further comprise a network interface device 708, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 can include a computer-readable storage medium (or, more specifically, a non-transitory computer-readable storage medium) 828 on which is stored one or more sets of executable instructions 822. In accordance with one or more aspects of the present disclosure, executable instructions 822 can comprise executable instructions performing method 700 of classifying vehicle lights using machine-learning models in autonomous vehicle applications.

Executable instructions 822 can also reside, completely or at least partially, within main memory 804 and/or within processing device 802 during execution thereof by example computer device 800, main memory 804 and processing device 802 also constituting computer-readable storage media. Executable instructions 822 can further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    obtaining, by a processing device, image data characterizing a driving environment of an autonomous vehicle (AV), wherein the image data comprises a first set of image frames captured using a first camera and a second set of image frames captured using a second camera, wherein the second camera is different from the first camera in at least:
        resolution, or
        image acquisition rate;
    identifying, by the processing device, based on the image data, a vehicle disposed within the driving environment;
    inputting the first set of image frames into a first neural network to obtain a first set of feature vectors;
    inputting the second set of image frames into a second neural network to obtain a second set of feature vectors;
    determining, using a combined set of feature vectors comprising the first set of feature vectors and the second set of feature vectors, a state of one or more lights of the vehicle; and
    causing, using an AV control system and in view of the state of the one or more lights of the vehicle, a travel path of the AV to be altered by changing at least one of a lane of motion of the AV or a speed of the AV.

2. The method of claim 1, wherein obtaining the image data comprises:
    annotating the first set of image frames with a boundary of the vehicle obtained using a plurality of lidar points associated with the vehicle.

3. The method of claim 1, wherein at least some of the feature vectors of the first set of feature vectors or the second set of feature vectors are associated with different times.

4. The method of claim 1, wherein each of the first neural network and the second neural network comprises at least one convolutional neuron layer.

5. The method of claim 1, wherein determining the state of the one or more lights of the vehicle comprises:
receiving, using the combined set of feature vectors, a set of values, each of the set of values associated with a respective candidate vehicle light classification of one or more candidate vehicle light classifications; and
selecting the state of the one or more lights of the vehicle from the one or more candidate vehicle light classifications based on at least one of the set of values satisfying a threshold condition.

6. The method of claim 1, further comprising:
receiving, by the processing device, lidar data characterizing the driving environment;
determining, by the processing device and based on the lidar data, a boundary of the vehicle within the image data; and
cropping, by the processing device, the image data based on the boundary of the vehicle.

7. The method of claim 1, wherein determining the state of one or more lights of the vehicle comprises:
processing, using a third neural network, the combined set of feature vectors to determine the state of the one or more lights of the vehicle.

8. The method of claim 1 further comprising:
predicting, by the processing device, a future action of the vehicle based on the state of the one or more lights of the vehicle; and
wherein causing the travel path of the AV to be altered is based on the predicted future action.

9. The method of claim 1, wherein at least one of the first neural network or the second neural network is trained using a plurality of sets of training data, wherein each set of the training data comprises one or more depictions of a vehicle having one or more lights in a state of operation, and an annotation identifying the state of operation of the one or more lights of the vehicle.

10. The method of claim 1, wherein prior to the inputting into the respective neural network, at least one of the first set of image frames or the second set of image frames is to undergo pre-processing comprising one or more of filtering, normalizing, cropping, or refining.

11. A system comprising:
a sensing system of an autonomous vehicle (AV), the sensing system comprising:
a first camera to capture first image data characterizing a driving environment of an autonomous vehicle (AV),
a second camera to capture second image data characterizing the driving environment of the AV, wherein the second camera is different from the first camera in at least:
resolution, or
image acquisition rate;
a memory; and
a processing device, coupled to the memory, to:
obtain, from the first camera, the first image data;
obtain, from second camera, the second image data;
identify, based at least on the first image data or the second image data, a vehicle disposed within the driving environment;
input the first image data into a first neural network to obtain a first set of feature vectors;
input the second image data into a second neural network to obtain a second set of feature vectors;
determine, using a combined set of feature vectors comprising the first set of feature vectors and the second set of feature vectors, a state of one or more lights of the vehicle; and
cause, in view of the state of the one or more lights of the vehicle, a travel path of the AV to be altered by changing at least one of a lane of motion of the AV or a speed of the AV.

12. The system of claim 11, wherein to determine the state of one or more lights of the vehicle, the processing device is to:
process, using a third neural network, the combined set of feature vectors determine the state of the one or more lights of the vehicle.

13. The system of claim 12, wherein to determine the state of the one or more lights of the vehicle, the processing device is further to:
receive, using the combined set of feature vectors, a set of values, each of the set of values associated with a respective candidate vehicle light classification of one or more candidate vehicle light classifications; and
determine the state of the one or more lights of the vehicle based on at least one of the set of values satisfying a threshold condition.

14. The system of claim 11, wherein the sensing system further comprises a lidar sensor to capture lidar data characterizing the driving environment, wherein the processing device is further to:
determine, based on the lidar data, a boundary of the vehicle within the image data; and
crop at least one of the first image data or the second image data based on the boundary of the vehicle.

15. The system of claim 11, wherein at least one of the first neural network or the second neural network is trained using a plurality of sets of training data, wherein each set of the training data comprises one or more depictions of a vehicle having one or more lights in a state of operation, and an annotation identifying the state of operation of the one or more lights of the vehicle.

16. A method comprising:
generating training data for training a machine learning model, wherein the training data comprises:
a first training input comprising:
first image data collected using a first camera, the first image data depicting a first vehicle in a first driving environment,
second image data collected using a second camera, the second image data depicting the first vehicle in the first driving environment, wherein the second camera is different from the first camera in at least:
resolution, or
image acquisition rate;
a first target output for the first training input, wherein the first target output indicates a first vehicle light classification corresponding to a first identified state of one or more lights of the first vehicle;
processing, using a first neural network of the machine learning model, the first image data to obtain a first set of feature vectors;
processing, using a second neural network of the machine learning model, the second image data to obtain a second set of feature vectors;

processing the first set of feature vectors and the second set of feature vectors to generate an output comprising a predicted first vehicle light classification; and changing parameters of the machine learning model based at least on (i) the output and (ii) the first target output.

17. The method of claim 16, wherein generating the training data comprises:
   identifying a second target output for the first training input, wherein the second target output indicates a second vehicle light classification corresponding to a second state of the one or more lights of the first vehicle; and
   merging the second target output with the first target output.

18. The method of claim 17, wherein:
   the first target output comprises the first vehicle light classification from a first selection of candidate vehicle light classifications; and
   the second target output comprises the second vehicle light classification from a second selection of candidate vehicle light classifications.

19. The method of claim 18, wherein the first selection of candidate vehicle light classifications and the second selection of candidate vehicle light classifications are each associated with at least one of:
   a flashing status of the one or more lights of the first vehicle;
   a turning status of the first vehicle; or
   a direction of travel of the first vehicle.

20. The method of claim 16, further comprising:
   obtaining image data characterizing a second driving environment of an autonomous vehicle (AV);
   identifying, based on the image data, a second vehicle disposed within the second driving environment; and
   processing the image data using the trained machine-learning model; and
   determining a state of one or more lights of the second vehicle using the processed image data.

* * * * *